US009129530B2

(12) United States Patent
Vorländer

(10) Patent No.: US 9,129,530 B2
(45) Date of Patent: Sep. 8, 2015

(54) ROUTE DETERMINATION SYSTEM

(75) Inventor: Peter Vorländer, Hamburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1072 days.

(21) Appl. No.: 12/115,445

(22) Filed: May 5, 2008

(65) Prior Publication Data

US 2009/0276150 A1 Nov. 5, 2009

(30) Foreign Application Priority Data

May 4, 2007 (EP) .................................... 07009032

(51) Int. Cl.
| | | |
|---|---|---|
| G01C 21/26 | (2006.01) | |
| G08G 1/0968 | (2006.01) | |
| G01C 21/34 | (2006.01) | |
| H04L 12/28 | (2006.01) | |
| G06Q 10/10 | (2012.01) | |

(52) U.S. Cl.
CPC ...... *G08G 1/096827* (2013.01); *G01C 21/3446* (2013.01); *G08G 1/096844* (2013.01); *G08G 1/096866* (2013.01)

(58) Field of Classification Search
CPC .... G01C 21/3492; H04L 45/02; H04L 45/12; H04L 45/14; G06F 17/30241; G06Q 10/047
See application file for complete search history.

(56) References Cited

U.S. PATENT DOCUMENTS

| | | | |
|---|---|---|---|
| 6,477,515 B1 | 11/2002 | Boroujerdi et al. | |
| 6,643,699 B1 * | 11/2003 | Liver | 709/226 |
| 6,892,133 B2 | 5/2005 | Kornhauser et al. | |
| 7,739,040 B2 * | 6/2010 | Horvitz | 701/414 |
| 8,249,810 B2 | 8/2012 | Jones | |
| 9,009,177 B2 * | 4/2015 | Zheng et al. | 707/758 |
| 2004/0078139 A1 | 4/2004 | Kornhauser et al. | |
| 2007/0005551 A1 * | 1/2007 | Winkler | 707/1 |
| 2007/0263590 A1 * | 11/2007 | Abileah et al. | 370/351 |

FOREIGN PATENT DOCUMENTS

| | | |
|---|---|---|
| JP | 2011319352 | 11/2001 |
| JP | 2002081952 | 3/2002 |
| JP | 2005009978 | 1/2005 |

OTHER PUBLICATIONS

Chabini, et al.; Adaptations of the A* Algorithm for the Computation of Fastest Paths in Deterministic Discrete-Time Dynamic Networks; IEEE Transactions on Intelligent Transportation Systems; vol. 3, No. 1, Mar. 2002; pp. 60-74.
Kanoulas, et al.; Finding Fastest Paths on a Road Network with Speed Patterns; Proceedings of the 22nd International Conference on Data Engineering (ICDE'06); 2006.
Japanese Office Action.

\* cited by examiner

*Primary Examiner* — Florian Zeender
*Assistant Examiner* — Dana Amsdell
(74) *Attorney, Agent, or Firm* — O'Shea Getz P.C.

(57) ABSTRACT

A system for determining a route is provided. The system includes a method for determining estimation function values corresponding to a plurality of vertices on a first graph, where the first graph corresponds to a first route network. The method further includes searching for a first route from a first starting point to the destination on a second graph based on the estimation function values. The system further includes a storage unit and a processor coupled to the storage unit for receiving graph data, where the processor is configured to determine estimation function values corresponding to a plurality of vertices on the first graph corresponding to a first route network, and is further configured to search for a route from a first starting point to the destination on a second graph based on the estimation function values. The device may further include an input unit, a clock unit, a traffic message receiver, and/or a position determining unit.

58 Claims, 19 Drawing Sheets

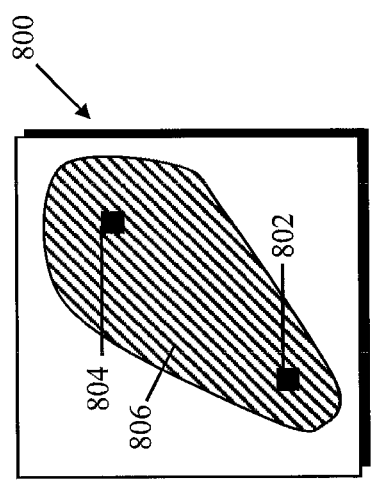

ROUTE DETERMINATION SYSTEM

RELATED APPLICATIONS

This application claims priority of European Patent Application Serial Number 07 009 032,9, filed on May 4, 2007, titled ROUTE DETERMINATION METHOD AND DEVICE, which application is incorporated in its entirety by reference in this application.

BACKGROUND OF THE INVENTION

1. Field of the Invention

This invention relates to route determination and, in particular, to a method and device for determining a route, e.g., on a road network, based on estimation function values.

2. Related Art

Finding a good, preferably optimum, route from a given starting point to a given destination is one of the key features of car navigation systems or other systems providing routing information. Throughout this specification, the term "optimum route" is used for a least-cost route, the costs of a route being determined by the sum of costs of edges and vertices of a graph traversed by the route. For example, when a route is determined in a road network, the costs of the route correspond to the costs of the road segments traversed plus the costs associated with road segment junctions. Depending on the cost model employed, the costs may reflect distances, travel times and/or user preferences. Similarly, terms such as "good route" refer to routes that are associated with small costs, i.e., the quality of a route is measured with reference to the costs accrued upon traversal of the route. For a given graph defined by a set of edges and a set of vertices at which graph edges interconnect, various cost models may be defined. For example, in navigation systems, different cost models may correspond to different optimization criteria, such as fastest route, shortest route, avoiding tunnels, avoiding highways, avoiding ferries, avoiding toll roads or similar, and combinations of these options and preferences.

Several standard algorithms for finding an optimum route or a good route on a graph are known in the art, the most famous of which are Dijkstra's algorithm and the A*-algorithm. In Dijkstra's algorithm, the road network, or more generally, a graph is explored starting from the starting point of the route by edge relaxation or expansion, the different vertices of the road network being visited in order of minimum costs associated with a route connecting the vertex and the starting point. When the destination is reached in the expansion of graph edges, an optimum route from the starting point to the destination has been found, and Dijkstra's algorithm terminates.

The A*-algorithm is a modification of Dijkstra's algorithm that employs an estimation function for vertices of the graph. The estimation function for a given vertex provides an estimate for costs associated with an optimum route connecting the given vertex and the destination. In the route search, different paths are ranked according to a priority which is given by the sum of the costs accrued from the starting point to the vertex so far, and the estimation function value for the vertex. If the estimation function is such that it never overestimates costs of an optimum route connecting a vertex and the destination, the A*-algorithm is known to find a correct solution to the optimum path problem. Conventionally, the estimation function is determined based on simple geometrical criteria, such as an air distance.

Frequently, the route search for car navigation is performed on a dual graph of the road network, in which vertices of the dual graph represent road segments of the road network, to accommodate turning restrictions. In many applications, a route search is nowadays expected to provide added convenience features, such as determining several alternative routes, accommodating user preferences, dynamical routing, or similar. Both the usage of the dual graph to perform the route search and the above-mentioned additional features are costly in view of storage space requirements and computational time.

Therefore, a need exists in the art for improved system for determining routes that allow the complexity of the route search to be decreased. In particular, a need exists in the art for improved systems for determining routes that have moderate storage space and/or computational time requirements.

SUMMARY

A system for determining a route is provided. In one example of an implementation, the system performs the method of determining estimation function values corresponding to a plurality of vertices on a first graph corresponding to a first route network, where estimation function values for a vertex in the plurality of vertices represents a lower bound on costs associated with a route from the vertex to a destination. The system further searches for a first route from a first starting point to the destination on a second graph based on the estimation function values, where the second graph is associated with a plurality of elements. The step of determining the estimation function values may be done utilizing a first cost model, and the step of searching for the first route may be done utilizing a second cost model.

According to another implementation, the method may further include a step of searching for a second route from the first starting point to the destination on the second graph based on the estimation function values, where the second route being different from the first route. In addition or in the alternative, the method may include monitoring a current position relative to the first route from the original starting point to the destination, where the step of searching for the second route is automatically initiated based on a result of the step of monitoring the current position. The method may also include monitoring changes of costs associated with at least one of the elements of the second graph, where the step of searching for the second route is automatically initiated based on a result of the step of monitoring changes of costs.

According to yet another example of an implementation, the system includes a storage unit for storing data defining a plurality of elements for at least one of a first graph and a second graph, and a processor coupled to the storage unit to retrieve the graph data. The processor is configured to determine estimation function values corresponding to a plurality of vertices on the first graph corresponding to a first route network, where an estimation function value for a vertex in the plurality of vertices represents a lower bound on costs associated with a route from the vertex to a destination. The processor is further configured to search for a route from a first starting point to the destination on a second graph based on the estimation function values, where the second graph is associated with a plurality of elements. The device may further include a second storage unit for storing the determined estimation function values. In addition, the device may include an input unit, a clock unit, a traffic message receiver, and/or a position determining unit.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 8A schematically illustrates a portion of a map explored in a first stage of a route search according to the method of FIG. 6.

DETAILED DESCRIPTION

As illustrated in connection with FIGS. 1-14, examples of various implementations of the system will be explained with reference to the drawings. The following description is given only for the purpose of better explaining the system and is not to be taken in a limiting sense. Unless specifically noted otherwise, the features of the various implementations described below may be combined with each other.

As will be further described below, the system may be utilized in routing on a road network and may be performed by a navigation system onboard a vehicle. While the system will be described with reference to a route search on a graph representing a road network, it will, however, be appreciated that the system is not limited to this type of application and may be readily utilized for determining routes in any graph or network in which route searches may be performed. For example, the system may be applied to route searches in power supply networks, in optical or electrical networks for signal transmission, in computer networks, ferry connections, data connections in a computer network, power transmission lines, airplane routes, or any other infrastructure or other network.

Figure 1:
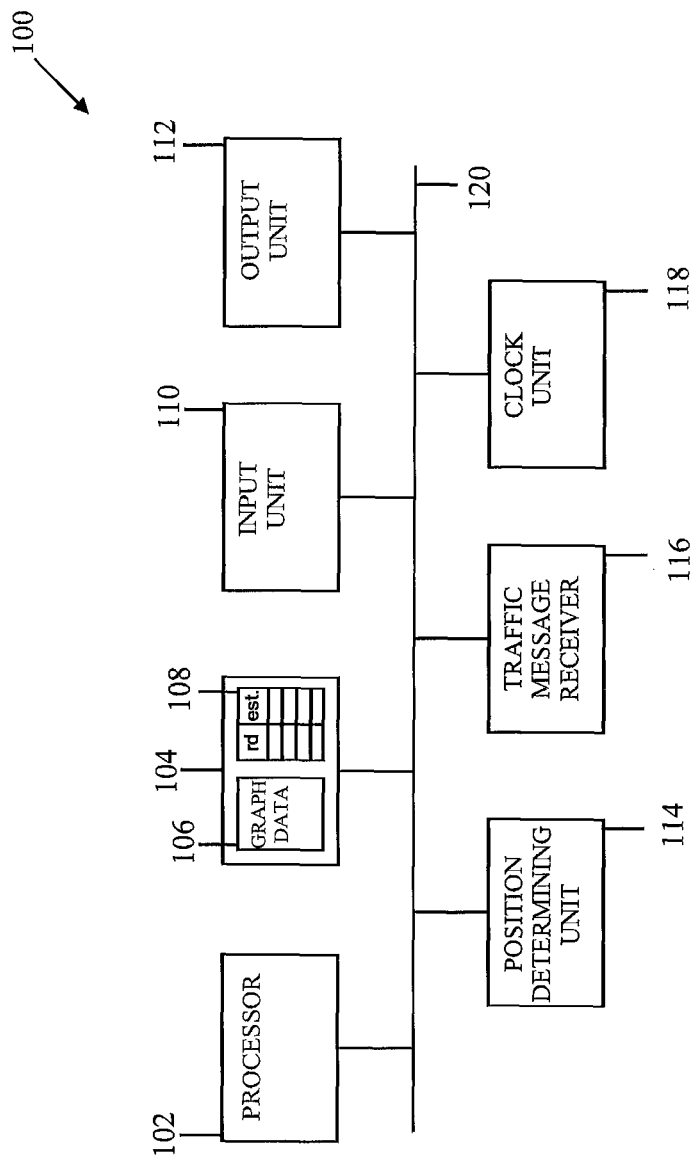
FIG. 1 illustrates one example of an implementation of a block diagram representing a navigation system capable of determining a route.

FIG. 1 illustrates one example of an implementation of a block diagram representing a navigation system 100 capable of determining a route. The system 100, which may be, for example, a navigation system, such as a portable navigation system or a navigation system that may be installed on a vehicle, allows route searches to be performed onboard a vehicle. The system 100 may include a processor 102, a data storage unit 104 having graph data 106 stored therein, an input unit 110 to receive a user input coupled to the processor 102, and an output unit 112.

The system 100 may, additionally or alternatively, include a clock unit 118, for example, to determine a time and/or date, the processor 102 being coupled to the clock unit 118 and configured to adjust costs of a cost model (as explained below) based on the time and/or date. The system 100 may, additionally or alternatively, include a traffic message receiver 116 to receive a traffic information signal, the processor 102 being coupled to the traffic message receiver 116 and configured to adjust costs of a cost model based on the traffic information signal. Thus, the system 100 may be configured to adjust costs of a cost model based on user preferences, based on time or date in dynamical routing, based on traffic information, or other factors.

The system 100 may also include a position determining unit 114 such as, for example, a GPS receiver, to determine a current vehicle position, the processor 102 being coupled to the position determining unit 114. The position determining unit 114 may compare the current vehicle position to the route from a starting point to the destination. The processor 102 may automatically perform a route search from the current vehicle position to the destination on a second graph based on a result of the comparison, as explained below.

In operation, the system 100 and processor 102 may be configured to perform various methods of operation. In accordance with one example, the data storage unit 104 may have instructions stored on the unit 104 that, when executed by the processor 102 of the system 100, the processor 102 is directed to perform a method according to any one aspect of the invention. The processor 102 may be adapted to perform searches for a route (which may be referred to as a "route search") on a graph represented by graph data 106 stored in the data storage unit 104. In particular, the processor 102 may be adapted to perform a route search employing a search method or search algorithm known to one of skill in the art. For example, a search algorithm may be used that is based on an estimation function, such as, for example, an A*-algorithm, Dijkstra's algorithm, or variants thereof. The data storage unit 104 may be any suitable storage medium known in the art, such as, for example, a CD-ROM, a CD-RW, a DVD, a memory card, or an internal hard disc. The graph data 106 stored in the data storage unit 104 may include information corresponding to vertices and/or edges of the applicable graph or road network. The vertices and/or edges of an applicable graph or road network may be referred to generally herein as an "element" or "elements." For example, the graph data 104 may include information corresponding to the geographical position of end points of road segments and/or connections to other road segments at these end points, such as at road junctions or crossings.

The graph data 106 may further include information relating to costs that are associated with road segments or road segment vertices. A set of costs associated with road segments or road segment vertices of a graph may be referred to as a "cost model." Depending on the particular cost model, the associated costs may represent, for example, the length of a road segment for a shortest route cost model, or the traversal time of a road segment and the time for turning from one road segment into another road segment at a junction or crossing for a fastest route cost model. Costs corresponding to various other cost models, such as for example, costs representing increments or absolute cost values of road segments or road segment vertices in dependence on user preferences, may also be stored in the data storage unit 104.

The data storage unit 104 may also store estimation function data 108 for a plurality of road segments or road segment vertices. The estimation function data 108 may include for example, estimation function values for a road segment vertex representing a lower bound on costs associated with a route from the road segment vertex to a destination. As will be explained in more detail below, after inputting of a destination by a user, the processor 102 may determine estimation function data 108 and then store the estimation function data 108 in the storage unit 104. In other examples, the estimation function data 108 may also be stored in a storage unit separate from the storage unit 104 storing the graph data 106, or may be held in a working memory. In one implementation of the invention, the processor 102 may determine the estimation function data 108 based on both the destination and a starting point of the route search. In this or another implementation of the invention, the processor 102 may set a starting point of the route search to be identical to the current vehicle position determined by the GPS receiver 114, or identical to a position that is determined based on the current vehicle position.

Data associated with the route, such as the route search destination, as well as data associated user preferences may be input into the system 100 via the input unit 110. The input unit 110 may be any known input unit including, for example, a touch screen, a keypad, or a microphone in combination with a speech recognition device. The processor 102 may then evaluate information input via input unit 110 to, for example, perform a search for a route, or adjust costs of a cost model based on user preferences. Data associated with a starting point of a route to the destination of the route may be output to the user via the output unit 112, which may be any known output unit, such as for example, a display screen and/or a loudspeaker.

In addition to data described above being provided to the processor 102, a current vehicle position determined by the position determining unit 114, as well as traffic information received at the traffic message receiver 116, may also be provided to the processor 102 which, as will be described more fully with reference to FIGS. 5-8 below. The processor 102 may then initiate a new route search based on the information provided by the position determining unit 114 and/or the traffic message receiver 116, utilizing the estimation function data 108 stored in the storage unit 104. Similarly, the clock unit 118 provides a current time of the day to the processor 102 that may adjust the cost model for the graph on which the route search is performed based on the current time of the day. For example, in dynamical routing, the cost model may be adjusted by taking into account time variations of costs associated with road segments and/or road segment vertices due to varying traffic conditions.

Figure 2A:
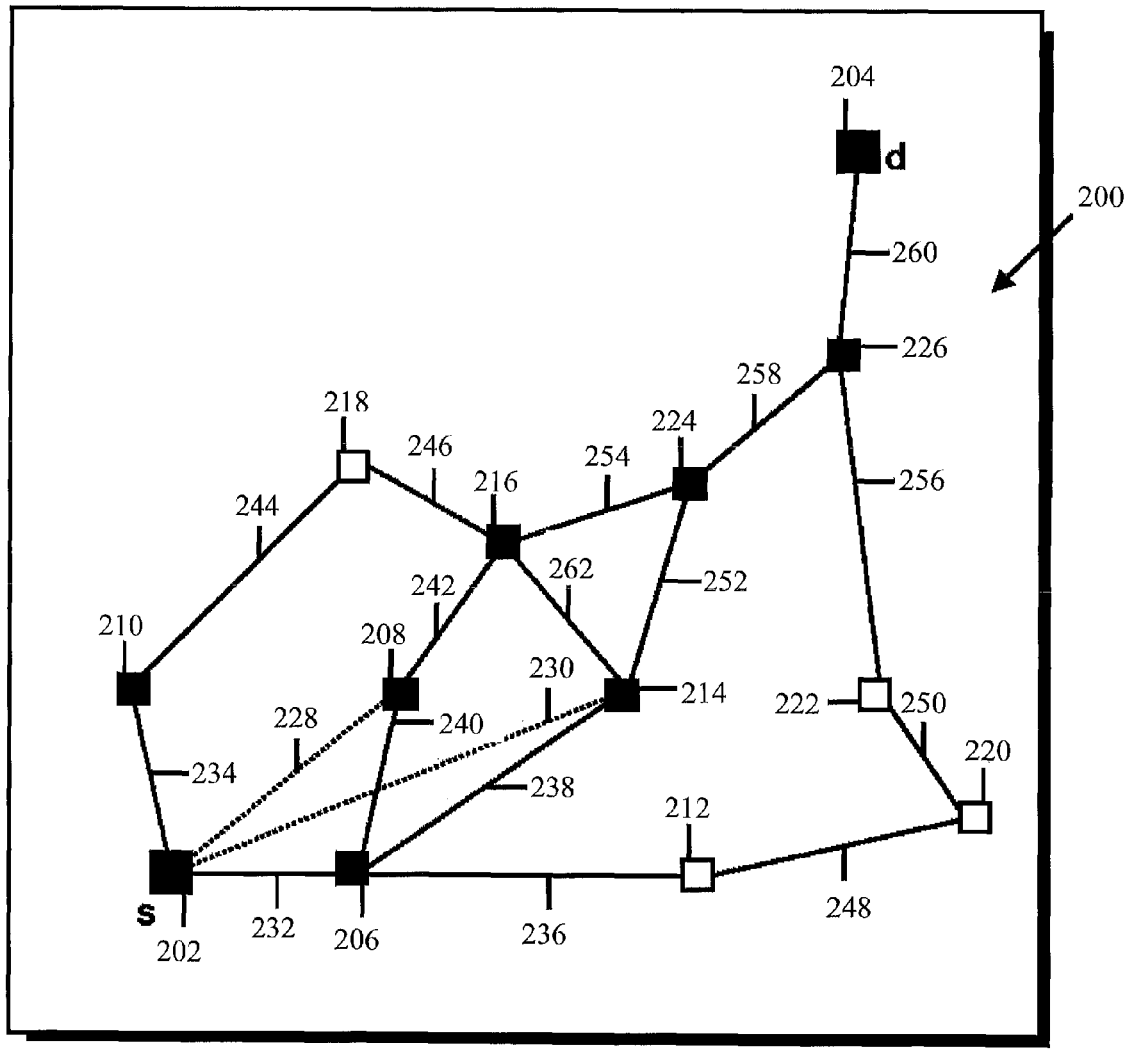
FIG. 2A schematically illustrates an example of a road network.
Figure 2B:
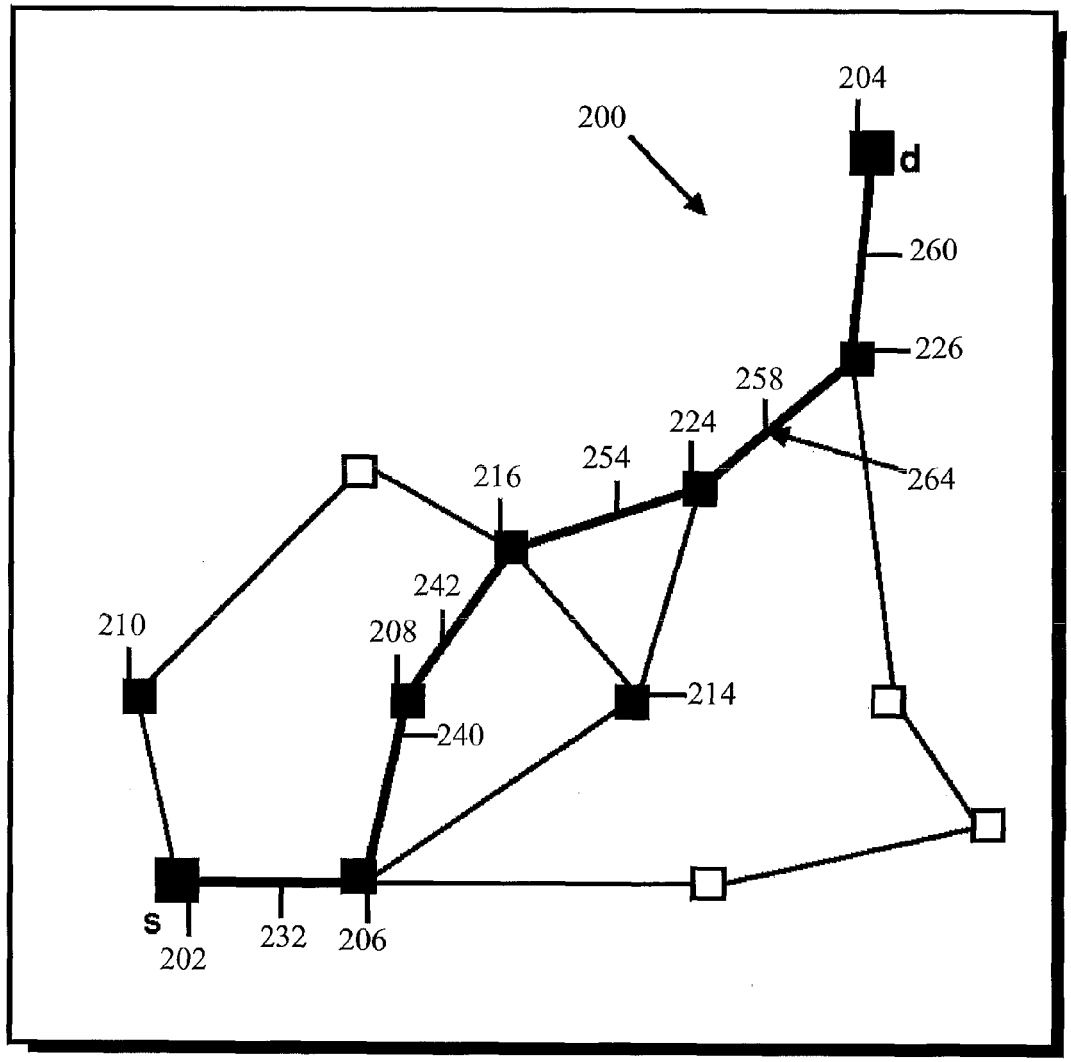
FIG. 2B schematically illustrates the road network of FIG. 2A in which an optimum route connecting the starting point and the destination is highlighted.
Figure 3:
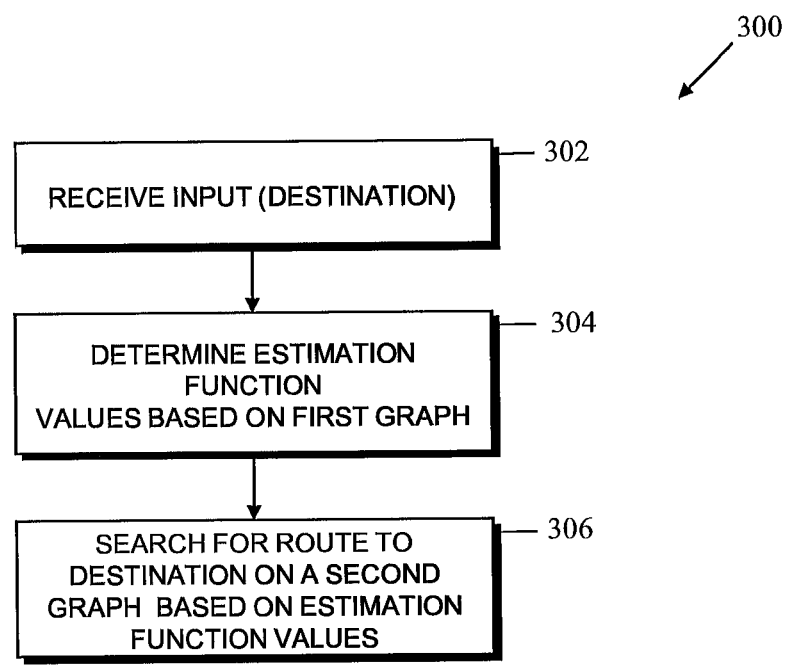
FIG. 3 is a flow diagram illustrating one example of an implementation of a method of determining a route.

With reference to FIGS. 2A, 2B and 3, a method (FIG. 3) of determining a route on a road network according to one example of an implementation of the invention will be described. The method may be performed by the processor 102 coupled to the data storage unit 104 of the system 100.

FIG. 2A schematically illustrates one example of a road network 200, and FIG. 2B schematically illustrates the road network 200 of FIG. 2A in which an optimum route connecting the starting point and the destination is highlighted. The road network 200 includes a plurality of road segment vertices 202-226 (thirteen in the example shown, however more or less may be included), indicated as boxes in FIGS. 2A and 2B, where the road segment vertices 202-226 may be interconnected by a plurality of road segments 228-262 (sixteen in the example shown, however more or less may be included). The road segments 228-262 form edges of the graph representing the road network 200 of FIGS. 2A and 2B.

FIG. 3 is a flow diagram illustrating one example of an implementation of a method 300 of determining a route. According to the method 300 illustrated in FIG. 3, at step 302, a user input indicating a desired destination is received. Next, at step 304, estimation function values based on a first graph (e.g., FIG. 2A) representing the road network 200 are determined. In particular, the estimation function values may be determined for a plurality of the vertices 202-226 of the road network 200 based on the road network 200. In general, the initial determination of the estimation function values may be referred to as a "first stage" of determining a route according to the invention.

The determining an estimation function value for a vertex in the first stage may include searching for a route from the vertex to the destination 204 on the first graph, which search may be performed using Dijkstra's algorithm or an A*-algorithm on the first graph. The route search on the first graph may be performed starting at the destination 204 and expanding the search towards the starting point 202. In other words, the search direction may be reversed in the first step. The estimation function value for a vertex determined at step 304 may provide a lower bound on costs associated with a route from the vertex to the destination. The term "based on the first graph" may refer to an action based not only based on a geometrical arrangement of individual vertices of the first graph, but may also be based on a relative arrangement and/or the interconnection of two or more vertices of the first graph by a graph edge. Since the estimation function values are determined based on the first graph rather than being based exclusively on air-distance based estimates, an estimation function may be determined that closely approximates the actual costs for a least-cost route from a vertex to the destination. Such an approximation function will be referred to as a "good" approximation function in the following. The good approximation function may, in turn, be employed to reduce complexity of a subsequent route search in a second stage, as discussed below.

Next, the estimation function values determined in step 304 may be utilized to search for a route on a second graph (e.g., FIG. 2B) from a starting point 202 to a destination 204, at step 306. Where the results of the "first stage" are used in connection with subsequent steps, these subsequent steps will be referred to as later stages. In the case of the method of FIG. 3, the second route search is referred to as the "second stage" of the method of determining a route. When the estimation function values are determined by performing a route search on the first graph (step 304), for vertices explored during the route search on the first graph, good approximation function values may be provided which may represent, or at least provide a good approximation to, the exact minimum costs associated with any route from the respective vertex to the destination. Based on this estimation function value, the search tree of the subsequent search in the second stage (or later stages as applicable) may be reduced in size.

As will be explained in more detail below, the first graph utilized at 304 to determine the estimation function values may be identical to or different from the second graph, on which the route search in step 306 is performed. In one example of an implementation, both the first graph utilized at step 304 and the second graph utilized at step 306 represent the road network 200 on which a route search is to be performed, with edges of the first graph and the second graph corresponding to road segments. Accordingly, for an example road network, such as the road network 200 of FIGS. 2A and 2B, the road segments 228-262 may correspond to edges of both the first graph and the second graph, and the road segment vertices 202-226 may correspond to vertices of both the first graph and the second graph.

It will be appreciated that many modifications of the method 300 may be implemented and will be apparent to one of skill in the art. For example, the route search (step 302) and the determination of estimation function values (step 304) may be based on different cost models, as will be explained in more detail with reference to FIGS. 5-8 below. In addition or in the alternative, the route search (step 306) may be based on estimation function values that are not determined at step 304, as will be explained in more detail with reference to FIGS. 11 and 12 below. In addition or in the alternative, the first graph that is employed to determine the estimation function values at step 304 and the second graph on which the route search is performed at step 306 may be distinct, as will be explained in more detail with reference to FIGS. 11 and 12 below. In addition or in the alternative, the method of determining a route 300 may include additional steps, as will be explained in more detail with reference to FIGS. 13-14 below.

Referring again to FIGS. 2-3, in one example of an implementation of the method 300 (FIG. 3) will be described referring to the road network 200 of FIGS. 2A and 2B. For illustrative purposes only, it will be assumed that the cost models for determining the estimation function values at step 304 and for the route search at step 306 are identical, and that both determining the estimation function values, at step 304, and conducting the route search, at step 306, may be performed on the same graph, namely on a primary graph in which the road segments 232-260 correspond to graph edges.

To determine the estimation function values under step 304, a route search is performed starting at the destination 204 and expanding towards the starting point 202. In one example of an implementation, the route search starting at the destination 204 may be performed using Dijkstra's algorithm. In another example of an implementation, the route search starting at the destination 204 and directed towards the starting point 202 may be performed employing an A*-algorithm. In the later case, any suitable estimation function known to one of skill in the art may be employed, such as, for example, an air-distance based estimation function, as schematically indicated by the dotted lines 228 and 230 in FIG. 2A. Further, it is noted that for a route search performed starting at the destination 204, costs associated with traversal of a road segment 232-260 or a vertex 202-226 may be equal to the costs associated with travel from the starting point 202 towards the destination 204. For example, even if road segment 260 is a one-way road that allows travel only from vertex 226 to vertex 204, in which case the costs for traversing the road segment 260 from vertex 204 towards vertex 226 are infinite, costs may be calculated such that only the smaller costs reflecting traversal of the road segment 260 from vertex 226 to vertex 204 are taken into account in the search starting at the destination 204. In other words, when determining the estimation function values in this example, only the search direction is reversed, while the routes found respect the traffic rules imposed on a travel from the starting point 202 to the destination 204 and therefore represent valid routes to the destination 204.

The route search starting at the destination 204, irrespective of whether it is performed using Dijkstra's algorithm, the A*-algorithm or another suitable algorithm, yields a search tree containing vertices of the road network 200 and, for each of these vertices, the costs associated with travel from the respective vertex to the destination 204. The route search starting at the destination 204 may be terminated when the starting point 202 is reached, or alternatively may also end earlier or be continued further. As an example only, the route search may be continued until, for example, the costs associated with the route reach a pre-determined threshold or the number of edge expansion steps in the algorithm reaches a given threshold. As another example, the route search starting at the destination 204 may be terminated even before the starting point 202 is reached. As will be appreciated, not all vertices 202-226 of the road network 200 have to be explored in the route search starting at the destination 204, depending on the termination criteria. For example, the costs associated with travel from the respective vertex to the destination 204 may be determined only for a subset of the vertices 202-226 of the road network 200. In the example road network 200 of FIGS. 2A and 2B, the route search starting at the destination 204 visits vertices 226, 224, 216, 214, 208, 206, 202 and 210, respectively, as schematically indicated by the squares in FIGS. 2A and 2B. For any vertex v of these vertices, the route search starting at the destination 204 provides the exact costs (v,d) for a route from the vertex v to the destination based on the cost model that is employed in the first stage. These costs may be subsequently used in the route search from the starting point 202 to the destination 204 at step 306.

With particular reference to FIG. 2B, the route search at step 306 of FIG. 3 will be explained in further detail. FIG. 2B schematically illustrates the road network 200 of FIG. 2A in which an optimum route 264 connecting the starting point 202 and the destination 204 is highlighted. In the exemplary road network 200, the optimum route 264 traverses road segments 232, 240, 242, 254, 258 and 260 and vertices 206, 208, 216, 224 and 226, respectively. The route search corresponding to FIG. 2B from the starting point 202 to the destination 204 may be performed using an A*-algorithm or another search algorithm utilizing an estimation. function, in which the next "branch" of the search tree leading to a vertex v is selected such that $$f(v)=g(v)+h(v) \qquad \text{Eq. (1)}$$

is a minimum, where $$g(v)=\text{costs}(s,v) \qquad (2)$$

represents the costs accrued along a route from the starting point s to the vertex v and $$h(v) \leq \text{costs}(v,d) \qquad (3)$$

is the estimation function value for the vertex v which represents a lower bound on the costs for a route from the vertex v to the destination d. For any vertex for which costs (v,d) has been determined in the search starting at the destination at step 304, the estimation function value h(v) may be set equal to costs(v,d):

$$h(v)=\text{costs}(v,d) \quad (4)$$

while for any vertex which has not been visited in the route search at step 304, another suitable estimation function value which satisfies Eq. (3) may be used, if required, as will be described in more detail with reference to FIGS. 9 and 10 below.

It will be appreciated that the estimation function value h(v) that has been determined based on the road network 200 represents the exact costs for the remaining path to the destination and therefore represents the best possible estimation function value, assuming that the cost model for the route search at 304 and for the route search at 306 is identical. Therefore, when a selected algorithm (such as, for example, an A*-algorithm) performed in step 306 utilizes the estimation function values h(v)=costs(v,d) found in step 304, the search tree may collapse onto a single branch that leads directly along the optimum route 264, i.e., from the starting point 202 via vertices 206, 208, 216, 224 and 226 to the destination 204. Since the search tree from the starting point 202 to the destination 204 only includes a single branch for the example shown in FIG. 2B, the route search according to the method 330 of FIG. 3 at step 306, which is based on the estimation function values determined at step 304, may require little computational resources. For example, a reduced computational time may be necessary in this situation as compared to the time required by an A*-algorithm, which exclusively uses air-distance based estimation function values.

Figure 4A:
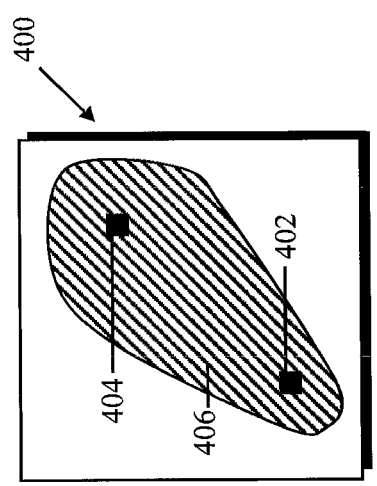
FIG. 4A schematically illustrates a portion of a map explored in a first stage of the route search according to an example of an implementation of the invention.

This effect of the method 300 is represented in FIG. 4A, which schematically illustrates a portion of a map explored in a first stage of the route search according to an example of an implementation of the invention. It will be assumed for this discussion that the route search being performed corresponding to FIG. 4A is from a starting point 402 to a destination 404. As illustrated in FIG. 4A, according to the method 300, in step 704, a region 406 of the map 400 is searched starting from the destination 404 and expanding the search towards the starting point 402 to determine estimation function values for vertices located inside this region 406.

Figure 4B:
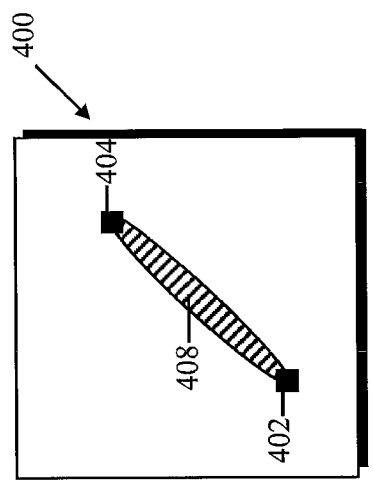
FIG. 4B schematically illustrates a portion of a map explored in a second stage of the route search according to an example of an implementation of the invention.

FIG. 4B schematically illustrates a portion of a map explored in a second stage of the route search according to another example of an implementation of the invention. As illustrated in FIG. 4B, in the subsequent route search, or second stage of determining a route, performed in step 306 from the starting point 402 to the destination 404, it may only be necessary to search a smaller region 408 of the map 400 since good estimation function values have been previously established in step 304 and are utilized in step 306.

Figure 4C:
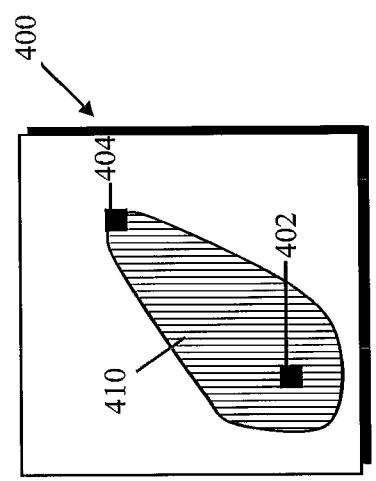
FIG. 4C schematically illustrates a portion of a map explored in a route search representing a conventional single-stage route search.

By contrast, when a conventional A*-algorithm (or other applicable algorithm) is performed to determine the route from the starting point 402 to the destination 404 by expanding the search tree starting at the starting point 402, a region 410 (see FIG. 4C) that is large compared to the region 408 (FIG. 4B) may have has to be searched, as schematically illustrated in FIG. 4C.

It is to be understood that, even when the estimation function values are determined based on the graph in step 304, the search tree that is explored in step 306 does not necessarily have to collapse onto a single search branch, as is typically the case in the example corresponding to FIG. 2B. As will be explained in further detail below, in the second stage of a method of determining a route according to the invention, at least one further route, different from the route, to the destination may be searched or determined based on the estimation function values. The at least one further route may comprise at least one of an alternative route from the starting point to the destination or a route from another starting point to the destination. The search for another route may, for example, be initiated when a vehicle leaves a pre-determined route, or when costs of edges or vertices of the second graph change, which may be affected by, for example, user-specified avoidance options, traffic information signals, dynamical routing, or other factors. By utilizing the results of the first stage, i.e., the estimation function values, for plural route searches, the average computational time required for a given route search may be reduced since intermediate results, namely the estimation function values, may be repeatedly used.

For example, as will be described more fully with reference to FIGS. 5-10 below, if the cost model employed in the second route search step 306 is different from the cost model used in the reverse search in the determining step 304, perhaps, for example, due to avoidance options, traffic information, dynamical routing or other factors, the costs costs(v,d) determined at 304 (in this example denoted by costs1(v,d) to reflect that these costs have been determined based on a first cost model used in the determining step 304), will in general not be identical to the minimum costs of a route from the vertex v to the destination d determined based on the new, second cost model used in the second searching step 306. The latter costs corresponding to the second cost model will be denoted by costs2(v,d) in the following. As will be explained further below, the estimation function values determined at step 304 may be employed as an estimation function in the second searching step 306 even when the first and second cost models are different.

Figure 5:
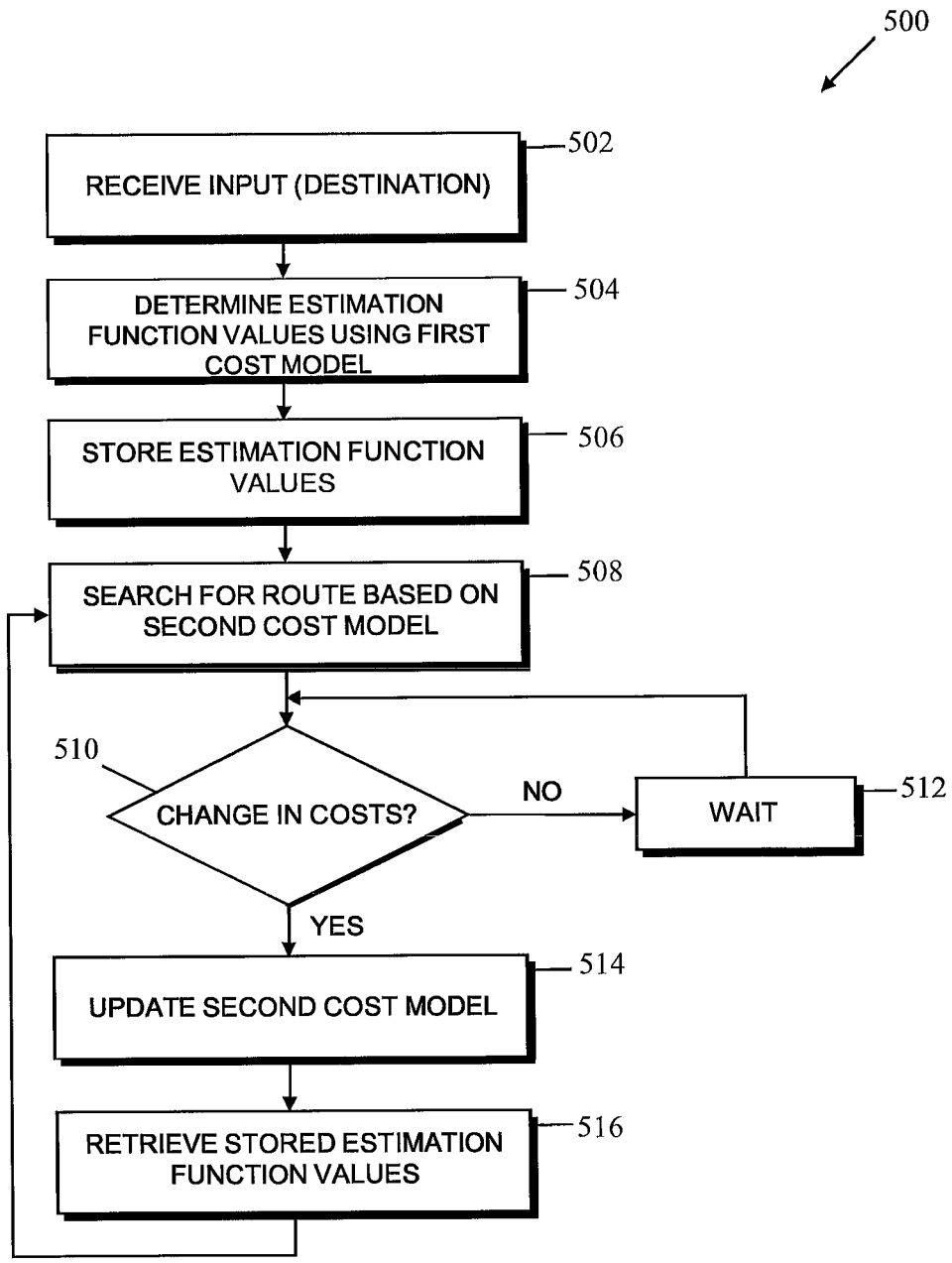
FIG. 5 is a flow diagram illustrating a method of determining a route according to another example of an implementation of the invention.

FIG. 5 is a flow diagram illustrating one example of another method 500 for determining a route. The method 500 may, for example, be performed by the processor 102 of a navigation system 100. In the method 500, a user input specifying a desired destination is first received at step 502. Next, estimation function values for a plurality of vertices are determined based on a first graph and utilizing a first cost model, at step 504. The determining of the estimation function values at step 504 may be implemented in any one of the ways described with reference to the method 300 of FIG. 3 above. In particular, the estimation function values for a plurality of vertices may be determined by performing a route search on the first graph starting at the destination (202 at FIGS. 2A and 2B) and expanding towards a starting point (202 at FIGS. 2A and 2B). For a vertex v of the plurality of vertices, the estimation function value determined at step 504 may be set equal to the costs associated with a route from the vertex v to the destination d according to the first cost model, costs1(v,d). Next, the estimation function values costs1(v,d) determined at 504 are stored in a storage unit for subsequent use at step 504. In the system 100 shown in FIG. 1, the estimation function values may also be stored in a storage unit 104 as data 108. In other words, the storage unit 104 storing graph data 104 and the storage unit storing the estimation function values may be integrally formed. Alternatively, the storage unit in which the estimation function values are stored may, however, also be distinct from the storage unit 104 storing the graph data 106. For example, the storage unit in which the estimation function values are stored may be a working memory, such as a RAM, in which the estimation function values are kept for subsequent use.

Next, a search for a route from the starting point 202 to the destination 204 may be performed on a second graph at step 508. Similar to step 306 in the method of FIG. 300, the route search at step 508 may be performed using an A*-algorithm or another algorithm that employs an estimation function. However, the second cost model employed in step 508 does not need to be identical to the first cost model. It will be assumed that, in the implementation of FIG. 5, the first cost model is selected such that it represents a lower bound on the second cost model employed in the route search of step 508. In other words, for any vertex or edge of the first graph, the costs associated with this vertex or edge according to the first cost model are less than or equal to the costs associated with a corresponding vertex or edge of the second graph according to the second cost model. The estimation function values determined at step 504 serve as estimation function values in the route search at step 508. Thus, the next branch of the search tree is selected so that $$f(v)+h(v) \quad (5)$$

is a minimum, where $$g(v)=costs2(s,v) \quad (6)$$

represents the costs accrued along a route from the starting point s to the vertex v according to the second cost model, and the estimation function value at vertex v is $$h(v)=costs1(v,d) \quad (7),$$

i.e., the costs determined at 504 according to the first cost model, when costs1(v,d) have been determined. The route determined at step 508 may then be output to a user.

After determining a route from the starting point 202 to the destination 204, it is determined whether an event incurring a change of costs of a vertex or edge of the second graph occurs, at step 510. If no cost change incurring event is detected at step 510, the determining step 510 is repeated after a wait state 512. If it is determined at step 510 that costs of a vertex or edge of the second graph according to the second cost model change, the second cost model may be updated at step 514 to accommodate the change in costs. As has already been explained above, the first cost model used in step 504 may be selected such that it provides a lower bound on costs according to the second cost model even when the latter is updated 514. In other words, the first cost model may be selected so that it represents a lower bound on any second cost model for which the results of the first stage are anticipated to be utilized.

Next the stored estimation function values may be retrieved at step 516, after which the method returns to step 508, where the route may again be determined based on the updated second cost model and the stored estimation function values.

It will be appreciated that according to the method 500 of the implementation of FIG. 5, the estimation function values determined based on the first cost model at 504 may be used several times for subsequent route determinations, at step 508, even when costs in the second cost model vary, without requiring the estimation function values to be recomputed, provided that the estimation function values determined at 504 underestimate the real costs associated with a route from a vertex v to the destination d determined according to the second cost model. This may be achieved by suitably selecting the first cost model. In one implementation of the invention, the first cost model may be selected such that, for any anticipated second cost model, the costs associated with traversal of a vertex or edge according to the first cost model are less than or equal to the costs associated with traversal of a corresponding vertex or edge according to an anticipated second cost model.

As further explained below, changes in the costs may be effected by various mechanisms, and the monitoring of cost change incurring events at step 510, and a suitable selection of the first cost model, may be implemented based on the specific mechanism. Possible sources for changes in the costs include user preferences such as avoidance options, variations in costs as a function of the time of the day and/or date in dynamical routing, the computation of alternative routes from the starting point to the destination, or traffic information signals, as will be explained below. The costs associated with vertices and/or edges of the first graph according to the first cost model may be time-independent. The costs associated with vertices and/or edges of the second graph according to the second cost model may be variable. The costs according to the second cost model may be varied based on at least one of user preferences, a traffic information signal, a time of the day or a date. The varying of the costs according to the second cost model may implemented by increasing costs for at least one vertex and/or edge relative to the first cost model. In this manner, a first cost model which does not take into consideration variable cost contributions may be employed to determine the estimation function values.

In one implementation of the invention, determining whether there is a change in cost, at step 510, may be effected by a change in user preferences, such as for example, by an avoidance option selected by the user. Such avoidance options may be taken into account in route determination by, for example, imposing cost penalties on, or otherwise increasing the costs associated with, road segments that meet specific criteria and which are to be avoided. For example, when it is desired to avoid tunnels or ferry connections, the costs of graph edges representing a tunnel or a ferry connection may be increased. The first cost model employed in the route search on the first graph at step 504 to determine the estimation function values may then be selected as a cost model that does not take into account any cost increase or penalty imposed by avoidance options. This may represent a fastest route or shortest route cost model. The second cost model employed in the route search at step 508 may initially be identical to the first cost model if no avoidance options have been selected by the user. The monitoring of cost change incurring events at step 510 may be implemented by monitoring user inputs specifying user preferences at the input unit 110. The second cost model may then be updated at step 514 by increasing costs according to selected avoidance options. Since the costs for any vertex or edge according to the first cost model selected as indicated above may represent a lower bound on the costs for the corresponding vertex or edge according to the second cost model, the estimation function values determined at step 504 may still underestimate the costs associated with a route from a vertex to the destination. These estimation function values determined at step 504 may therefore still be employed when the A*-algorithm (or other applicable algorithm) is re-executed at step 508, the value of g(v)=costs2(s,v) [Eq. (6)] now being determined based on the updated second cost model which may vary due to user preferences, as explained above.

In one implementation, cost changes may be effected internally by the processor 102 to determine alternative routes. The estimation function values may be determined at step 504 by performing a route search on the first graph based on a first cost model which may or may not take into account user avoidance options. A first route from the starting point 202 to the destination 204 may be determined at step 508 based on the second cost model, which may initially be set to be equal to the first cost model. After the first route has been found, costs for edges and/or vertices traversed by the first route are increased at step 514. The route search at step 508 may then be repeated based on the updated second cost model in which the first route has been made less favorable, and employing the estimation function values determined at step 504 based on the first cost model. Thereby, a second route, alternative to the first route, from the starting point 202 to the destination 204 may be found. Steps 514, 516 and 508 may subsequently be iterated. For example, the costs along the second route may also be increased, and a third route may be determined, which is another alternative to both the first route and the second route, etc. It will be appreciated by one of skill in the art that in situations in which the processor 102 automatically updates the second cost model without requiring an external trigger event, the monitoring step 510 and the wait step 512 may also be omitted, and the steps 514, 516 and 508 may be automatically repeated whenever the second cost model is updated.

In one implementation, cost changes may be caused by, for example, traffic information signals, such as signals indicating a traffic jam or other adverse traffic condition. In such an implementation, the estimation function values may be determined at step 504 by performing a route search on the first graph based on a first cost model which may or may not take into account user avoidance options, but which does not take into account cost increases affected by adverse traffic conditions. The thus determined estimation function values are stored in a storage unit 104 at step 506. If no information on adverse traffic conditions is initially available, the route search at step 508 may be performed based on a second cost model which may initially be set equal to the first cost model. To determine the existence of any cost change incurring events at step 510, the processor 102 of the system 100 may evaluate traffic information signals received by the traffic message receiver 116, which may, for example, be configured as a TMC receiver.

When the processor 102 determines that the received traffic information signal may affect costs of a vertex or edge traversed by the route previously determined at 508, it updates the second cost model at 514 by incrementing the costs of the respective vertex or edge based on the received traffic information signal. In this implementation of the invention, the update of the second cost model may be performed when a traffic information signal associated with any vertex or edge of the graph is received. The route may then be re-determined based on the updated second cost model to determine $g(v)$ and based on the estimation function values $h(v)$ determined at step 504. Since the costs of the first cost model generally represent lower bounds on the costs of the second cost model, the latter still provides a valid estimation function. Steps 514, 516 and 508 may be repeated whenever a further traffic information signal is received.

In another implementation of the invention, cost changes may be effected by pre-defined time variations of costs as a function of time of day or date. Such time-varying costs may be employed, for example, in a dynamical route search in which varying traffic conditions as a function of time of day and/or date are taken into account. The first cost model employed in determining the estimation function values at 504 may then be selected so that, for any vertex or edge, the costs of the first cost model correspond to the minimum costs associated with this vertex or edge at any time of the day and/or date. In the route determination at 508, the second cost model may then be selected in dependence on a time and/or date determined by the clock unit 118 so as to reflect the time-varying costs. In other words, the time-varying contributions to costs of vertices and edges may be only taken into account in the route determination at step 508, but not for the determining of the estimation function values at step 504. Since the costs of the first cost model generally represent lower bounds on the costs of the second cost model, the latter still provides a valid estimation function and may be employed in the route search at step 508. If time-varying contributions to the costs change because, for example, a pause is made during traversal of a route, the second cost model which takes into account time-varying costs may be updated at step 514 and a route may be re-determined at step 508.

It will be appreciated by those of skill in the art that user preferences, alternative route determination, traffic information signals, and dynamical route determination, as discussed above, represent example scenarios in which a cost model may vary, but that that the implementation of FIG. 5 is not restricted to these scenarios.

Figure 6:
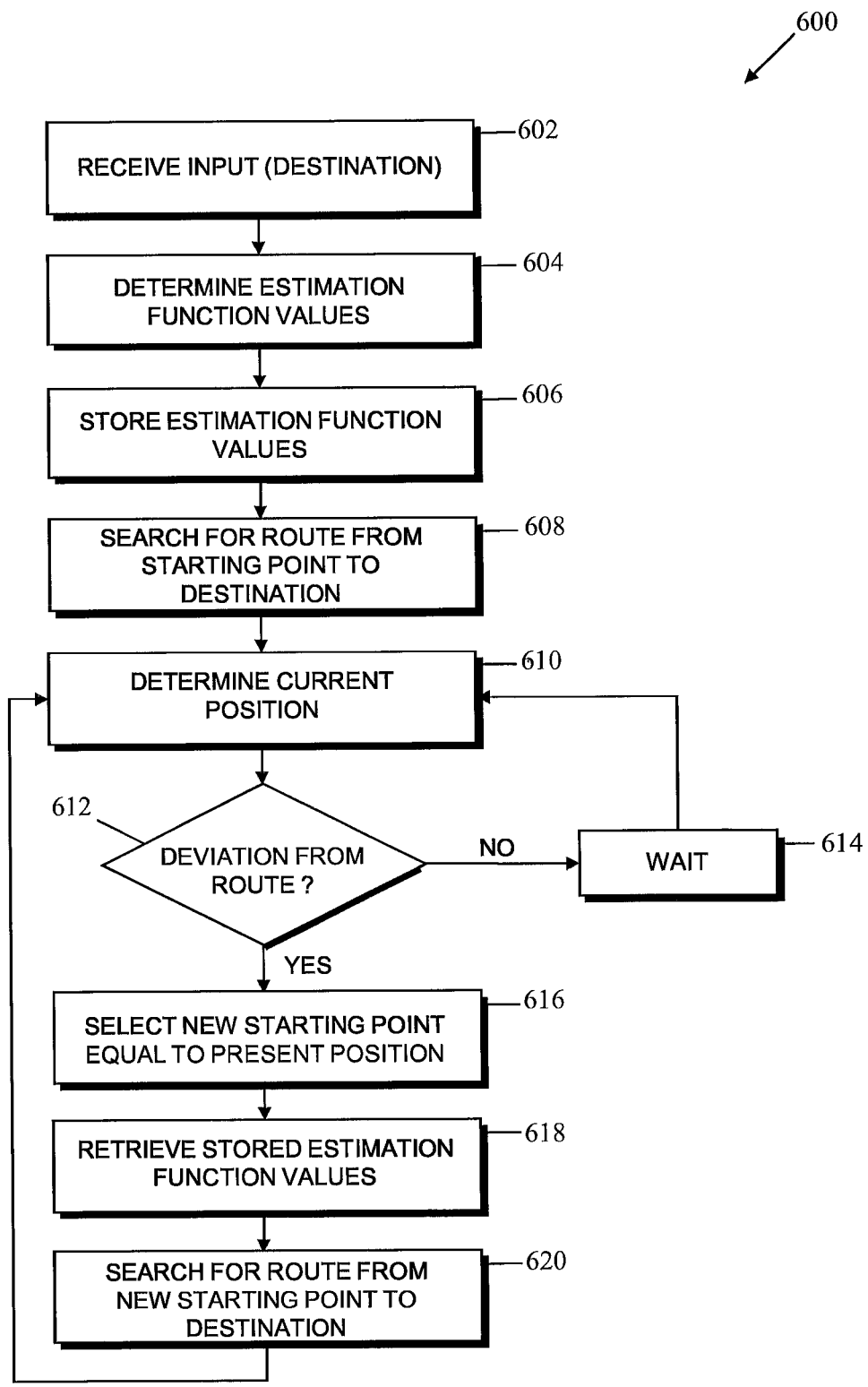
FIG. 6 is a flow diagram illustrating a method of determining a route according to another example of an implementation of the invention.
Figure 7:
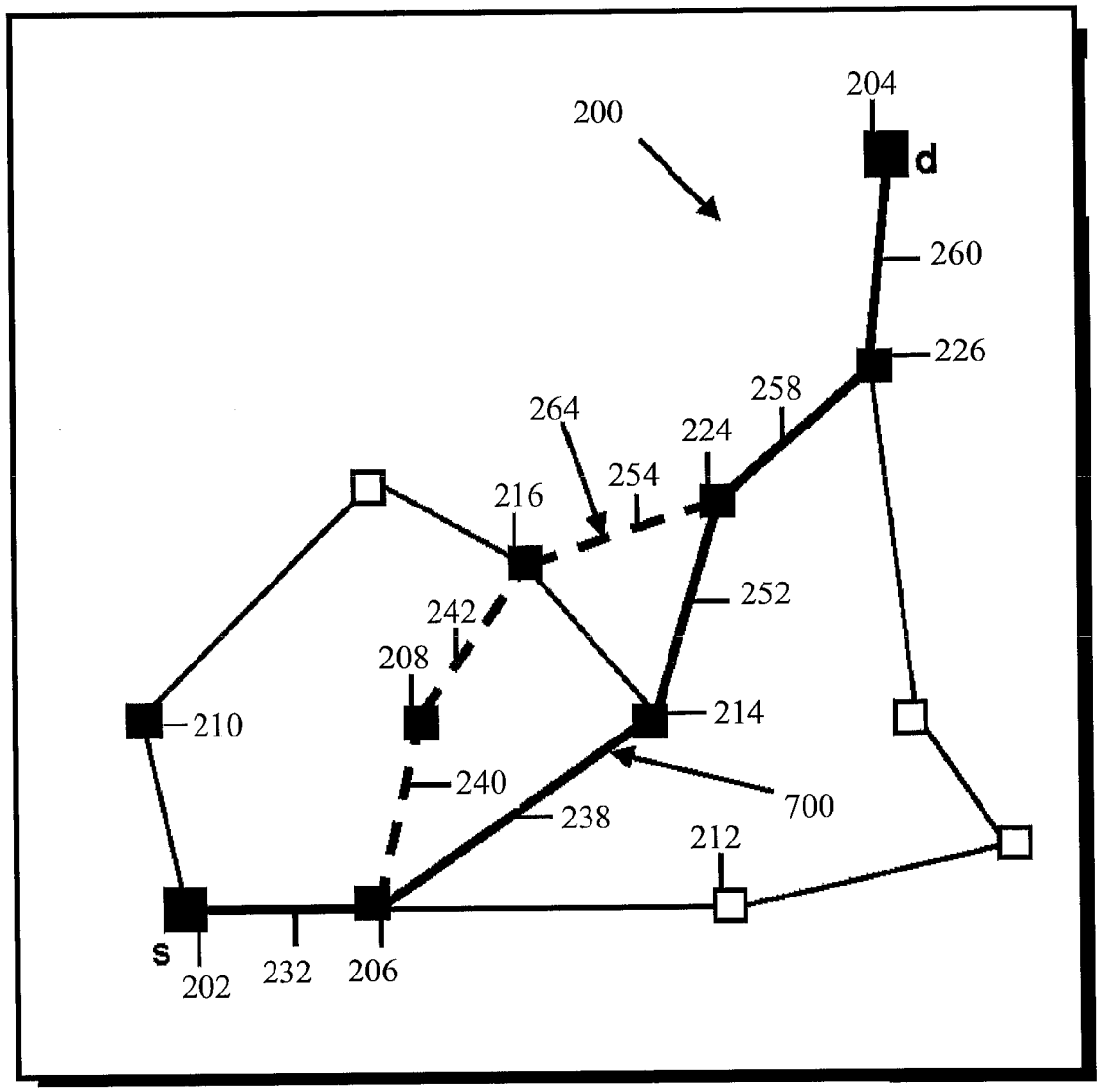
FIG. 7 schematically illustrates a route network corresponding to the methods of FIGS. 5 and 6.

FIG. 7 schematically illustrates a route network 200 corresponding to the methods of FIGS. 5 and 6. As has been explained with reference to FIGS. 2A and 2B above, a first and second graph are assumed to be identical and to represent the primary graph, in which graph edges represent road segments of the road network 200. At step 504 of the method 500 of FIG. 5, estimation function values may be determined for the vertices 202, 206, 210, 208, 214, 216, 224 and 226, indicated by the solid squares in FIG. 7. The optimum route 264 from the starting point 202 to the destination 204 originally determined traverses road segments 232, 240, 242, 254, 258 and 260. If costs for the road segment 240 increase, due to, for example user preferences, alternative route determination, traffic information signals, dynamical route determination, or other factors, the route search at step 508 may still be performed utilizing the estimation function values $h(v) = costs1(v,d)$ originally determined for the vertices 202, 206, 210, 208, 214, 216, 224 and 226, but employing the updated second cost model having increased costs for the road segment 240 to determine $g(v) = costs2(s,v)$. Due to the increased costs for the road segment 240, the new optimum route 700 traverses road segments 232, 238, 252, 258 and 260, as schematically indicated in FIG. 7. Since the estimation function values, $h(v) = costs1(v,d)$, determined in step 504 are determined based on the graph 200, they provide an estimation of the costs from a vertex v to the destination d which may be close to the actual costs according to the second cost model, thereby reducing the size of the portion of the graph 200 that has to be searched to find the route. While, when the first and second cost models are different, the route search at step 508 may also require estimation function values to be determined for further vertices for which no estimation function value has been determined at step 504 (such as, for example, for vertex 212 in FIG. 7), the required additional estimation function values may be readily established as will be explained in more detail with reference to FIGS. 9 and 10 below.

FIG. 6 is a flow diagram illustrating a method 600 of determining a route according to a third example of an implementation of the invention. According to this method 600, estimation function values determined based on a first graph are employed to determine a route from a starting point 202 to a destination 204 and, when a deviation from the route is detected, from another starting point, such as, for example, a current vehicle position, to the destination 204.

In the method 600, a user input specifying a desired destination is received at step 602. Next, estimation function values for a plurality of vertices are determined at step 604 based on a first graph and utilizing a first cost model. The determining of the estimation function values at step 602 may be affected in any one of the ways described above. In particular, the estimation function values for a plurality of vertices may be determined by performing a route search on the first graph starting at the destination 204 and expanding towards the starting point 202. For a vertex v of the plurality of vertices, the estimation function value determined at 604 may be set equal to the costs associated with a route from the vertex v to the destination d in the first cost model, costs1(v,d).

The estimation function values, costs1(v,d), determined at 604 may then be stored in a storage unit for subsequent use at step 606. As explained above, the storage unit 104 storing graph data 106 and the storage unit storing the estimation function values may be integrally formed. Alternatively, the storage unit in which the estimation function values are stored may be distinct from the storage unit 104 storing the graph data 106. Next, a search for a route from the starting point 202 to the destination 204 is performed on a second graph and based on a second cost model at step 608. The second cost model may be identical to or different from the first cost model. However, in one implementation, the first cost model employed at 604 is selected so that, for any vertex or edge of the first graph, the costs according to the first cost model represent a lower bound on a corresponding vertex or edge of the second graph according to the second cost model. Similar to step 306 in the method of FIG. 3, the route search at step 608 may be performed using an A*-algorithm or another known algorithm that utilizes the estimation function values determined at 604 as an estimation function.

At step 606, a current vehicle position is determined. In the system 100, the current vehicle position may be determined based on a signal output by the position determining unit 114 as is well known in the art. The current vehicle position is then compared to positions along the route in order to determine whether the vehicle has deviated from the original route, step 612. If no deviation from the original route has occurred, the current position of the vehicle is again determined (step 610) after a pre-determined wait period 614.

If, however, a deviation from the original route is detected at step 612, the present vehicle position or another position proximal to the present vehicle position is selected as a new starting point (step 616), and the stored estimation function values are retrieved (step 618). At step 620, a search for a route from the new starting point to the destination 204 is performed on the second graph and based on the second cost model. The estimation function values determined at step 604 may be employed in the new route search 620 in, for example, an A*-algorithm or other known algorithm. The method then returns to the step of determining the current vehicle position relative to the active route (step 610). It will be appreciated that, by appropriate choice of the first cost model at step 604, the estimation function values determined at 604 may still represent a valid estimation function in the route search at 620 even when the first and second cost models are different. Further, as will be described in more detail below, the first graph, based on which the estimation function values are determined at 604, and the second graph, on which the route searches at steps 608 and 620 are performed, may be identical or different.

It is to be understood that the methods of FIGS. 5 and 6 may be combined. For example, the results of a step in which estimation function values are determined based on a first graph may be employed both for determining several different routes from one starting point to the destination, such as in alternative route searches, and for determining routes from different starting points to the destination, such as, for example, when a deviation form the original route is detected.

Turning again to FIG. 7, the implementation of the method 600 of FIG. 6 may be illustrated with reference to the road network 200. If, after traversing road segment 232 of the route 264, the user turns onto road segment 238 rather than onto road segment 240 at the vertex 206, a deviation from the original route 264 is detected (step 612). Responsive thereto, a new route may be determined from the present vehicle position on road segment 240, or from the next vertex 214 to be reached (step 620), to the destination 204, utilizing the estimation function values that have been previously determined in step 604.

Figure 8B:
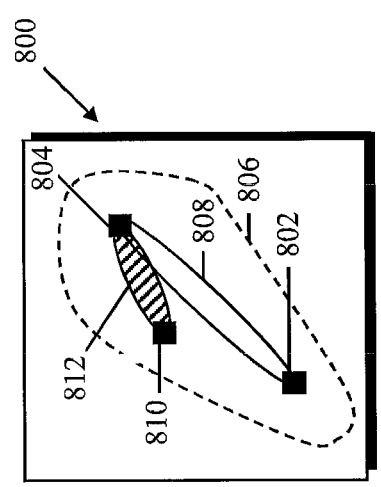
FIG. 8B schematically illustrates a portion of a map explored in a second stage of a route search according to the method of FIG. 6.

To further illustrate the method 600 of FIG. 6, reference will now be made to FIGS. 8A & 8B. FIG. 8A schematically illustrates a portion of a map explored in a first stage of a route search according to the method of FIG. 6. FIG. 8B schematically illustrates a portion of a map explored in a second stage of a route search according to the method of FIG. 6. For illustrative purposes, it is assumed that the cost model employed in determining the estimation function values at step 602 and the cost model employed in the route searches at steps 608 and 620 are identical or differ only slightly. It will be appreciated, however, that these cost models may differ more significantly.

In FIGS. 8A and 8B, a starting point of the route search is indicated at 802, and a destination is indicated at 804. FIG. 8A schematically indicates a region 806 that is visited at step 604 when estimation function values are determined by performing a route search starting at the destination 804 and expanding towards the starting point 802. In the route search at step 604 of the method of FIG. 6, estimation function values are determined for vertices located in the region 806. In FIG. 8B, the region 808 schematically indicates the portion of the map 800 that is explored in the route search from the starting point 802 to the destination 804 at step 608 of the method of FIG. 6. As has been previously explained with reference to FIG. 6 above, the region 808 may be small since the estimation function values determined based on the graph may represent a good approximation to the exact minimum costs. When the vehicle leaves the route that has been originally determined and is located at a new position (e.g., 810), a further route search from the new position 810 to the destination 804 is triggered. The region 812 schematically indicates the portion of the map 800 which is explored in this new route search, using the estimation function values previously determined. Since the new route search also employs the estimation function values determined based on the graph, the region 812 that needs to be explored may again be small. For illustrative purposes only, assuming that the cost model employed in determining the estimation function values at step 604 and the cost model employed in the route searches at steps 608 and 620 are identical, the search trees in the searches at steps 604 and 608 may collapse onto one search branch.

When the route search is performed in the steps or phases explained with reference to FIGS. 1-8 above, a route search from the starting point 202 to the destination 204 may use estimation function values for vertices for which no estimation function value has been determined in an earlier step or phase. This situation may occur, for example, when the estimation function values have been determined only for a portion of all vertices (which may result due to the particular termination criteria employed), when the first cost model and the second cost model employed in the first and second step, respectively, are different, or when the vehicle deviates from the original route. As will be explained below, estimation function values for additional vertices may be determined during a later step of the route determination, if desired or necessary.

Figure 9:
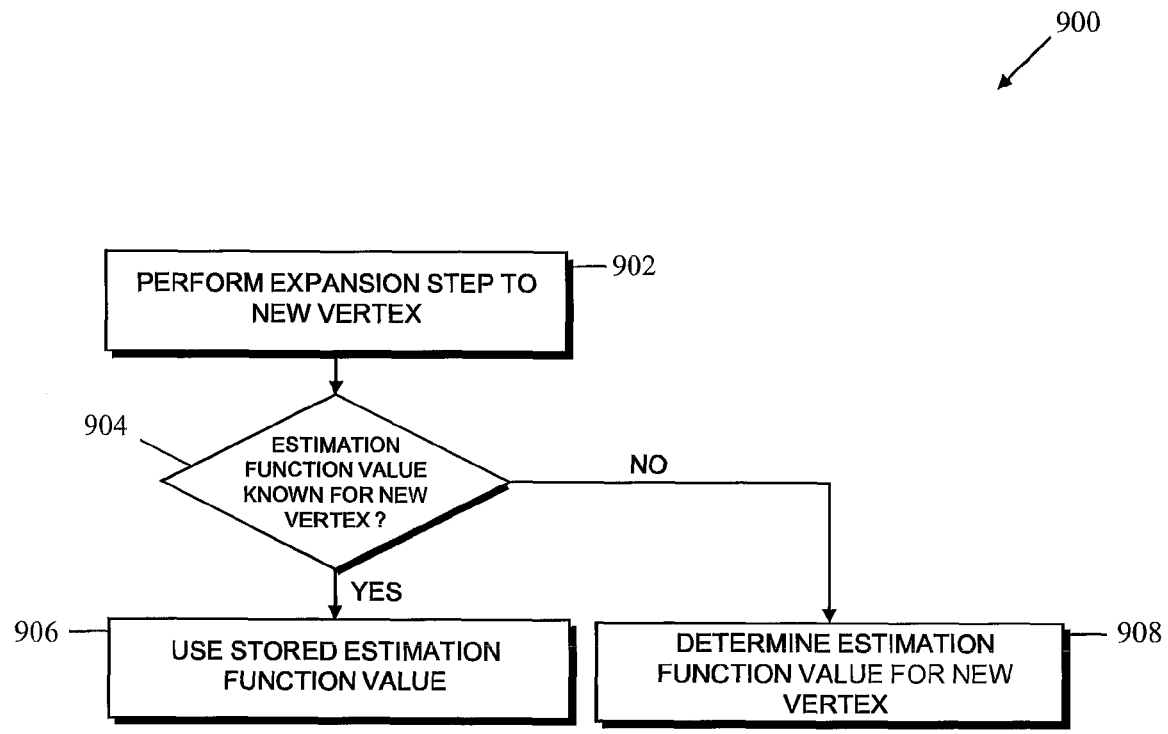
FIG. 9 is a flow diagram illustrating a method utilizing stored estimation function values in a route determination.

FIG. 9 is a flow diagram illustrating a method utilizing stored estimation function values in a route determination. The method of FIG. 9 may be employed in the second route search steps of FIG. 3, 5 or 6. For illustration rather than limitation, it will be assumed that the route search from the starting point to the destination is performed using an A*-algorithm. As explained above, other algorithms known in the art may be used.

First an expansion step is performed from a "leaf" of the search tree (step 902), i.e., from one of the last vertices in a search branch extending from the starting point. Next, it is determined whether the estimation function value for the new vertex (i.e., the new vertex to which the search tree is expanded in step 902) has been determined in the first route search of the applicable method employed (such as the method of either FIG. 3, 5 of 6) (step 904). If the estimation function value has already been determined, the stored estimation function value, costs1(v,d), for the new vertex is used as estimation function h(v) for the new vertex (step 906). If the estimation function value for the new vertex has not yet been determined, it is determined (step 908).

The step of determining the estimation function value for the new vertex, at step 908, may be performed in various ways. For example, the estimation function value for the new vertex may be determined by beginning at step 304 in FIG. 3, and continuing until the estimation function value is also know for the new vertex. For example, where the performance of step 304 includes a route search starting at the destination 204 and expanding towards the starting point 202 as discussed above, this route search may be continued until the new vertex is reached.

Figure 10:
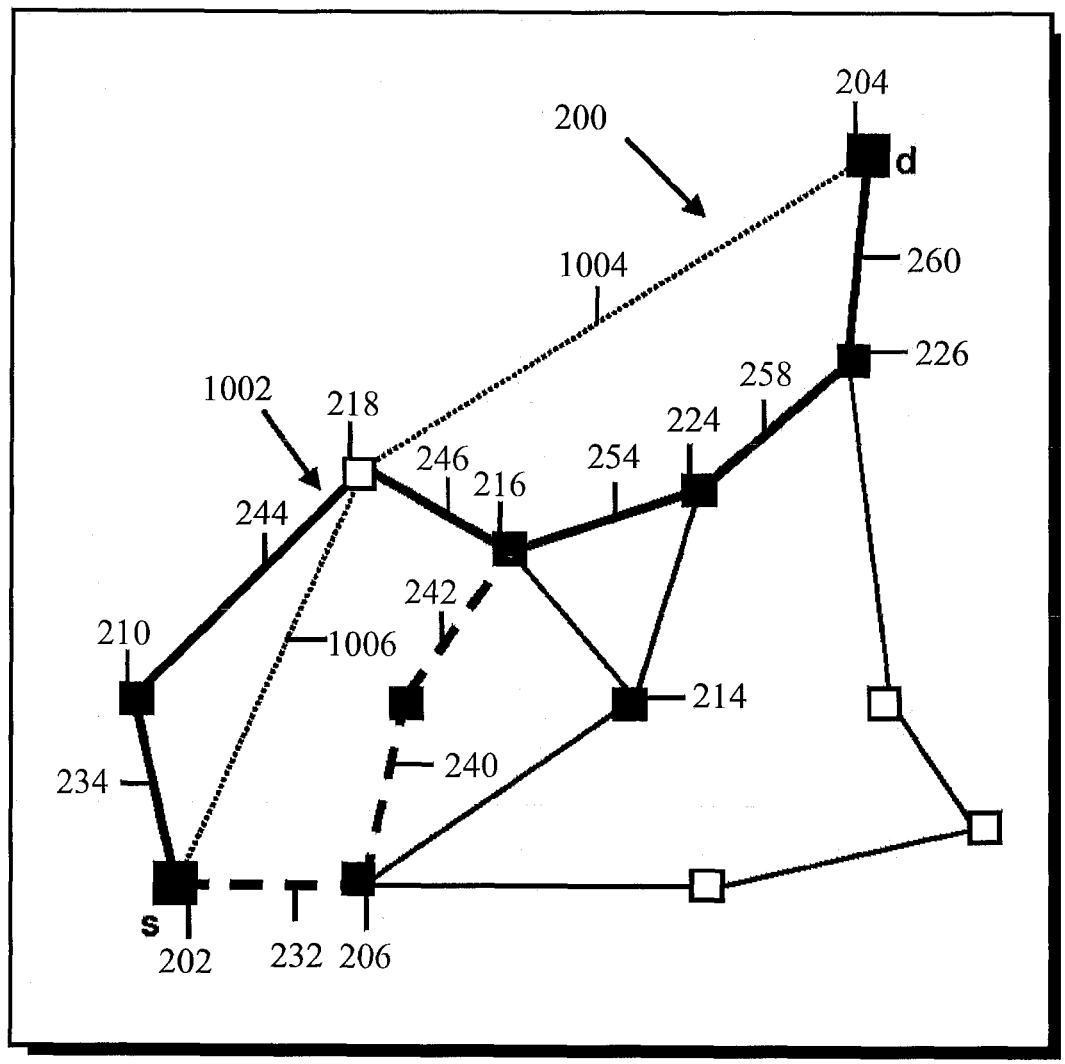
FIG. 10 schematically illustrates a route network corresponding to the method of determining the estimation function value for a new vertex in accordance with FIG. 9.

FIG. 10 schematically illustrates a route network corresponding to the method of determining the estimation function value for a new vertex 218 in accordance with FIG. 9. For purposes of discussion, it will be assumed that the costs of road segment 232 have increased, such as for example due to avoidance options, so that the optimum route from the starting point 202 to the destination 204 no longer traverses the road segment 232. After a first expansion step from the starting point 202 toward vertex 210, the subsequent expansion leads to the new vertex 218, for which no estimation function value has been determined in any of the previous steps discussed above, as indicated by an open square. However, since both costs1(vertex 216, d) for a route from vertex 216 to the destination 204 and costs1(vertex 210, d) for a route from vertex 210 to the destination 204 has already been determined (such as, for example, in step 304 or 504 of FIGS. 3 and 5, respectively), the estimation function value for the new vertex 218 may be determined by expanding the search from vertices 210 and 216 to the new vertex 218 and determining the smaller one of costs1(vertex216, d) plus the costs associated with a route from the new vertex 218 to vertex 216, and costs1 (vertex210, d) plus the costs associated with a route from the new vertex 218 to vertex 210.

In another implementation of the method of FIG. 9, the estimation function value for the new vertex 218 may be determined at step 908 based on information previously determined (such as in steps 304 or 504 of FIG. 3 or 5, respectively) without requiring the initial route search to be continued. For illustration rather than limitation, an estimation function value for the new vertex 218 may be determined at step 908 based on a maximum value of the estimation function initially determined (such as in steps 304 or 504 of FIG. 3 or 5, respectively) and the estimation function employed in the route search starting at the destination 204 and expanding towards the starting point. In other words, if $$\max 1 = \max_v \text{costs1}(v,d) \tag{8}$$

denotes the maximum costs for any vertex v, and h1(v) denotes the estimation function employed in the route search, which represents a lower bound on costs associated with a route from the starting point s to the vertex v, then the estimation function value h(v) for any vertex v employed in the second route search, may be set equal to $$h(v) = \text{costs1}(v,d) \tag{9a}$$

if this value has been initially determined (such as in steps 304 or 504 of FIG. 3 or 5, respectively), or $$h(v) = \max 1 - h1(v) \tag{9b}$$

otherwise.

As has been explained with reference to FIG. 2A above, the estimation function h1(v) employed in the first stage may be air-distance based, such as the air distance for a shortest route cost model, or the air distance divided by a characteristic travel speed in a fastest route cost model.

Referring again to FIG. 10 for further illustration of the method of determining the estimation function value for the new vertex 218 of FIG. 9, it is again assumed that the search from the starting point 202 to the destination 204 has expanded to vertex 218 for which no estimation function value has been previously determined (such as in steps 304 or 504 of FIG. 3 or 5, respectively). However, it is also assumed that max1=costs(vertex 210, d) has been determined. Further, assuming that an air-line based estimation function h1 has been employed in the initial step of determining estimation function values, h1(vertex 218) may be readily determined from the air-line distance between the vertex 218 and the starting point 202, schematically indicated at 1006. From max1 and h1(vertex 218), h(vertex 218) may be determined according to Eq. (9b). Alternatively, the estimation function value for the new vertex 218 may be determined based on the air distance from the new vertex 218 to the destination 204, schematically indicated at 1004, in a manner similar to that discussed above.

In the various examples of implementations described with reference to FIGS. 1-10 above, the first graph based on the determined estimation function values, and the second graph on which the route search from a starting point to a destination is performed, have been assumed to be identical. However, one of skill in the art would understand that the first and second graphs may also be distinct, as will be explained below.

Figure 11:
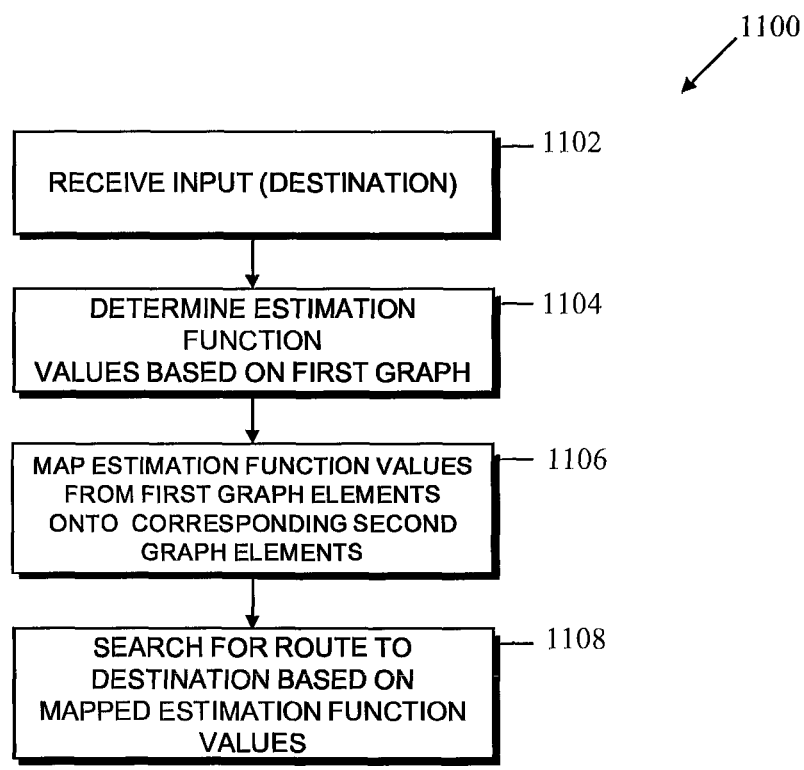
FIG. 11 is a flow diagram illustrating a method of determining a route according to another example of an implementation of the invention.

FIG. 11 is a flow diagram illustrating a method 1100 of determining a route according to yet another example of an implementation of the invention. In the method 1100, at step 1102, a user input specifying a desired destination is received. Next, estimation function values for a plurality of vertices and/or edges of a first graph are determined based on a first graph, at step 1104. The determining of the estimation function values at step 1104 may be affected in any one of the ways described with reference to FIGS. 2-3 above. In particular, the estimation function values may be determined by performing a route search on the first graph starting at the destination and expanding towards a starting point. The estimation function value determined for a given vertex of the first graph at step 1104 may be set equal to the costs associated with a route from the vertex to the destination on the first graph. Additionally or alternatively, estimation function values may be determined for characteristic points on edges of the first graph. Next, estimation function values determined for the various vertices or edges of the first graph may be mapped onto estimation function values for corresponding elements of a second graph, at step 1106, and then a route search may be performed on the second graph utilizing the estimation function values established at step 1104 and mapped onto the vertices and edges of the second graph at step 1108.

Figure 12:
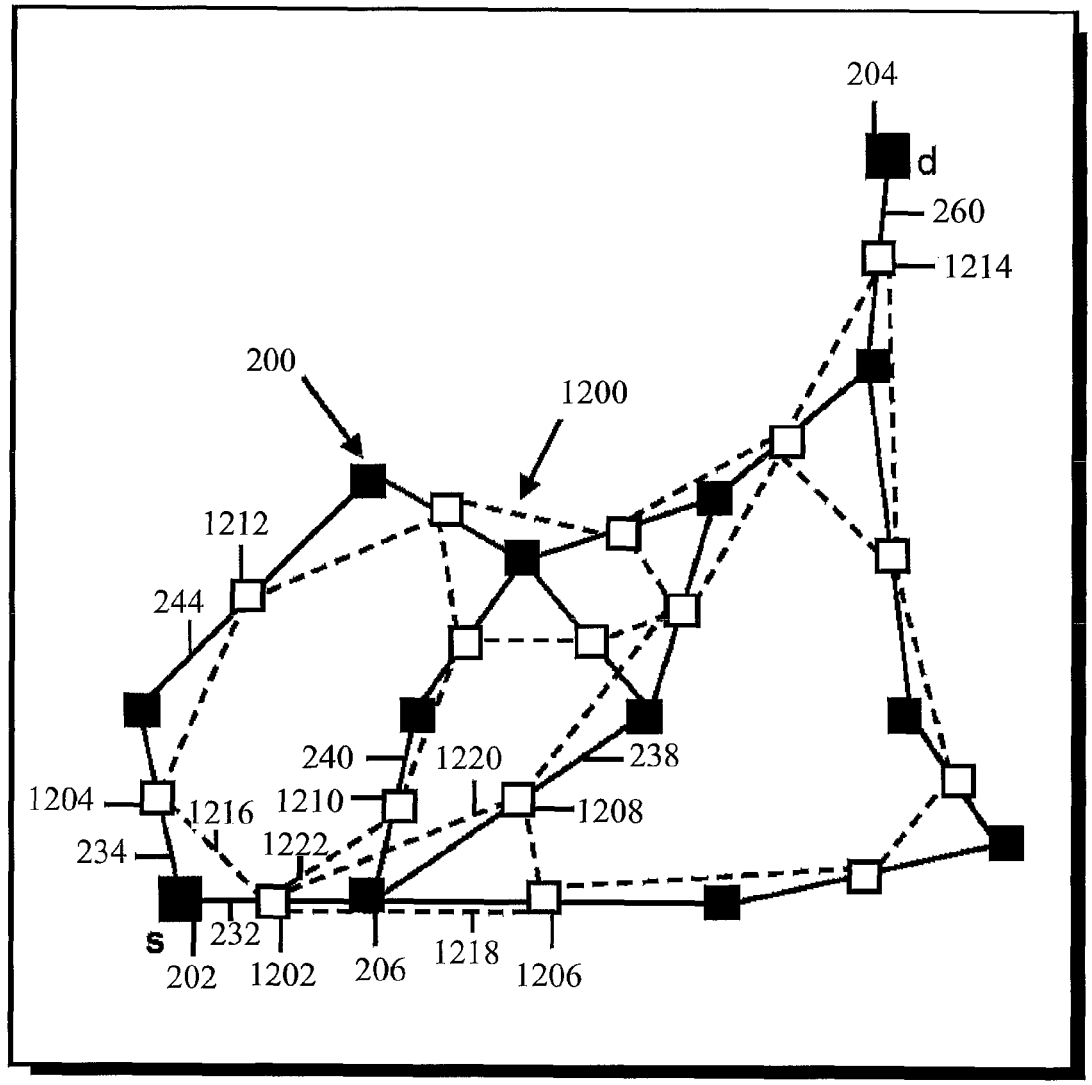
FIG. 12 schematically illustrates a first and second route network corresponding to the method of FIG. 11.

FIG. 12 is a schematic illustrating a first route network 200 and a second route network 1200 corresponding to the method of FIG. 11. The first route network 200 of FIG. 12 represents the first graph referenced above with respect to the method of FIG. 11, based on which the estimation function values are determined. In particular, edges of the first graph represent road segments of the first route network 200, and vertices of the first graph represent end points of road segments of the first route network 200. Vertices of the first graph of the first route network 200 are indicated by solid squares, and edges of the first graph of the first route network 200 are indicated by solid lines in FIG. 12.

The second route network 1200 of FIG. 12 represents the second graph referenced above with respect to the method of FIG. 11. In particular, the second graph is the "dual graph" of the road network 1200, such that the vertices 1202-1214 of the second road network 1200 represent corresponding road segments of the first road network 200. For example, vertex 1202 represents corresponding road segment 232, vertex 1204 represents corresponding road segments 234 etc. Edges 1216-1222 of the second graph 1200 represent end points of the road segments of the first route network 200, which allow a transition from one road segment of the first route network 200 to another road segment of the first route network 200. For example, an edge 1216 connecting vertices 1202 and 1204 indicates that a transition between road segments 232 and 234 is possible at the starting point 202. Similarly, the fact that there is no edge connecting vertices 1208 and 1210 indicates that a transition between road segments 240 and 238 at junction 206 is not possible. Therefore, turning restrictions may be readily taken into account in the dual graph schematically illustrating second route network 1200, since they are reflected by interconnection of dual graph vertices by dual graph edges. Vertices of the second route network 1200 are indicated by open squares, and edges of the second route network 1200 are indicated by dashed lines in FIG. 12.

As may be seen in FIG. 12, the first graph representing the first route network 200 and second graph representing the second route network 1200 may be different from one another, e.g., one being the dual graph of the other. In such an implementation, the initial determination of estimation function values step 1104 may be performed on the first graph representing the first route network 200, for example by performing a route search on the first graph starting at the destination 204 and expanding towards the starting point 202. For any vertex of the first graph contained in any branch of the resulting search tree, the costs associated with a route from the vertex to the destination 204 on the first graph may thereby be determined. The costs determined for every vertex explored in the step of determining estimation function values based on the first graph 1104 are then mapped onto corresponding edges and vertices of the second graph representing the second route network 1200. For example, if the vertices 1202-1214 of the second graph are located on the center points of corresponding edges of the first graph, as shown in FIG. 12, for any vertex of the vertices 1202-1214 of the second graph, an estimation function value may be determined based on the costs for the end points of the road segment represented by the respective vertex of the second graph.

For illustration, once the costs for routes from vertex 202 to the destination 204 and from vertex 206 to the destination 204 have been determined, the estimation function value for the vertex 1202 of the second route network 1200 may be determined to be equal to the minimum of costs1 (vertex 206, d) plus one half of the costs associated with traversal of road segment 232 from vertex 206 to vertex 202, and costs1(vertex 202, d) plus one half of the costs associated with traversal of road segment 232 from vertex 202 to vertex 206, where "costs1" represents the costs determined based on the first route network 200 during the step of determining the estimation function values. After mapping of estimation function values from vertices and/or edges of the first route network 200 onto corresponding vertices and/or edges of the second route network 1200, the route search on the second graph may be performed as described for any one of the implementations of FIGS. 1-10 above.

It will be appreciated that the two cost models employed in the various methods of the invention may be identical, but may also be different from each other when the first graph and the second graph are different, as described with respect to FIGS. 11 and 12. In particular, the first cost model that is employed to determine the estimation function values based on the first graph may be independent of additional costs incurred by user preferences, traffic information signals, time-varying cost contributions or similar, while the latter may be accounted for in the second cost model.

It is to be understood that the schematic illustration of the first and second graphs in FIG. 12 is only illustrative and is not to be construed or understood in a limiting sense. In particular, the first and second graphs may be defined in more complex manners in order to account for various factors including, for example, one-way restrictions, different travel speeds in opposite travel directions, or turning restrictions that are dependent on the travel direction or similar. For example, each travel direction of a road segment may be represented by an edge in the first graph and by a vertex in the second graph, so that a road segment which is not a one-way street may be represented by two edges of the first graph and two vertices of the second graph, respectively.

Referring back to the method of FIG. 11, since the first and second graphs employed at steps 1104 and 1106 may be different from each other, the first graph may be selected so that a route search on the first graph is, on average, faster than a route search on the second graph. For example, the first graph may be selected or defined such that it has a smaller number of vertices than the second graph. As further explained herein, by such a suitable definition of the first graph, the computational complexity and/or storage space requirements in determining the estimation function values may be reduced. For example, vertices of the first graph may represent road segments of a road network, and, in the first stage, turning restrictions in the road network may be neglected. The first and second graphs may also be defined so that edges of the first graph represent road segments of a road network, and vertices of the second graph represent road segments of the road network. In other words, the first and second graphs may be dual graphs to one another. In another implementation, the first graph may be identical to the second graph.

In connection with the method of FIG. 11, the step of determining the estimation function values (step 1104) may be implemented by performing a route search between center points of road segments, neglecting information on the direction in which road segments have been reached and neglecting costs associated with turning from one road segment to another. In other words, the step of determining the estimation function values (step 1104) may be performed on a graph in which turning restrictions in the road network represented by the graph are neglected. In such an implementation where turning restrictions are neglected, one-way restrictions may still be taken into account, or may also be neglected as well. Also in this implementation, the first graph, based on which the estimation function values are initially determined, is the primary graph, while the route search in the second step is performed on the secondary graph, where turning restrictions may be neglected in determining the estimation function values (step 1104).

While the method according to various implementations of the invention has been described generally as process having two primary steps with reference to FIGS. 1-12 above, additional steps may be implemented. For example, results of one or several of the preceding steps discussed above with respect to FIGS. 1-12 may be utilized in a subsequent step. For illustration, the step in which the estimation function values are determined, may comprise several sub-steps, where the determining of the estimation function values for plural vertices of the first graph may be a multi-stage process in which results of one stage are utilized in another stage.

Figure 13:
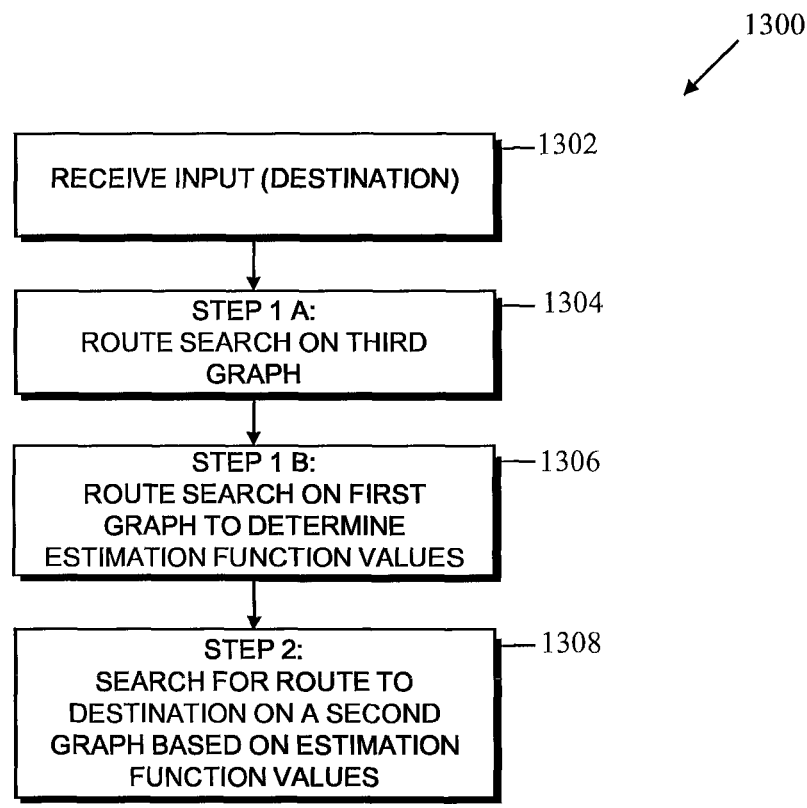
FIG. 13 is a flow diagram illustrating a method of determining a route according to yet another example of an implementation of the invention.

FIG. 13 is a flow diagram illustrating a method 1300 of determining a route according to another example of an implementation of the invention. In accordance with the method of FIG. 13, the step of determining the estimation function values discussed above with respect to FIGS. 1-12 is performed in a multi-stage process. At step 1302, a user input specifying a desired destination is first received. Next, estimation function values are determined (steps 1304 and 1306) for vertices of a first graph by first performing a route search on a third graph (step 1304), and then utilizing the results of the route search on the third graph 1304 in a second route search on the first graph (step 1306). The route search on the first graph 1306 yields estimation function values for a plurality of vertices of the first graph. The determined estimation function values are then utilized in a third route search from a starting point to the destination (step 1308). According to the method of FIG. 13, the third graph utilized in step 1304 may be defined such that the two-stage process at steps 1304 and 1306 allows the estimation function values for the plurality of vertices to be more readily determined. In particular, the second route search performed at step 1306 may use an A*-algorithm starting at the destination and expanding towards the starting point, and the first route search may be performed on the third graph to provide more accurate estimation function values for the A*-algorithm that is performed at 1304. By iteratively utilizing results of preceding stages in subsequent stages, the computational complexity of the route search may be further reduced.

Figure 14A:
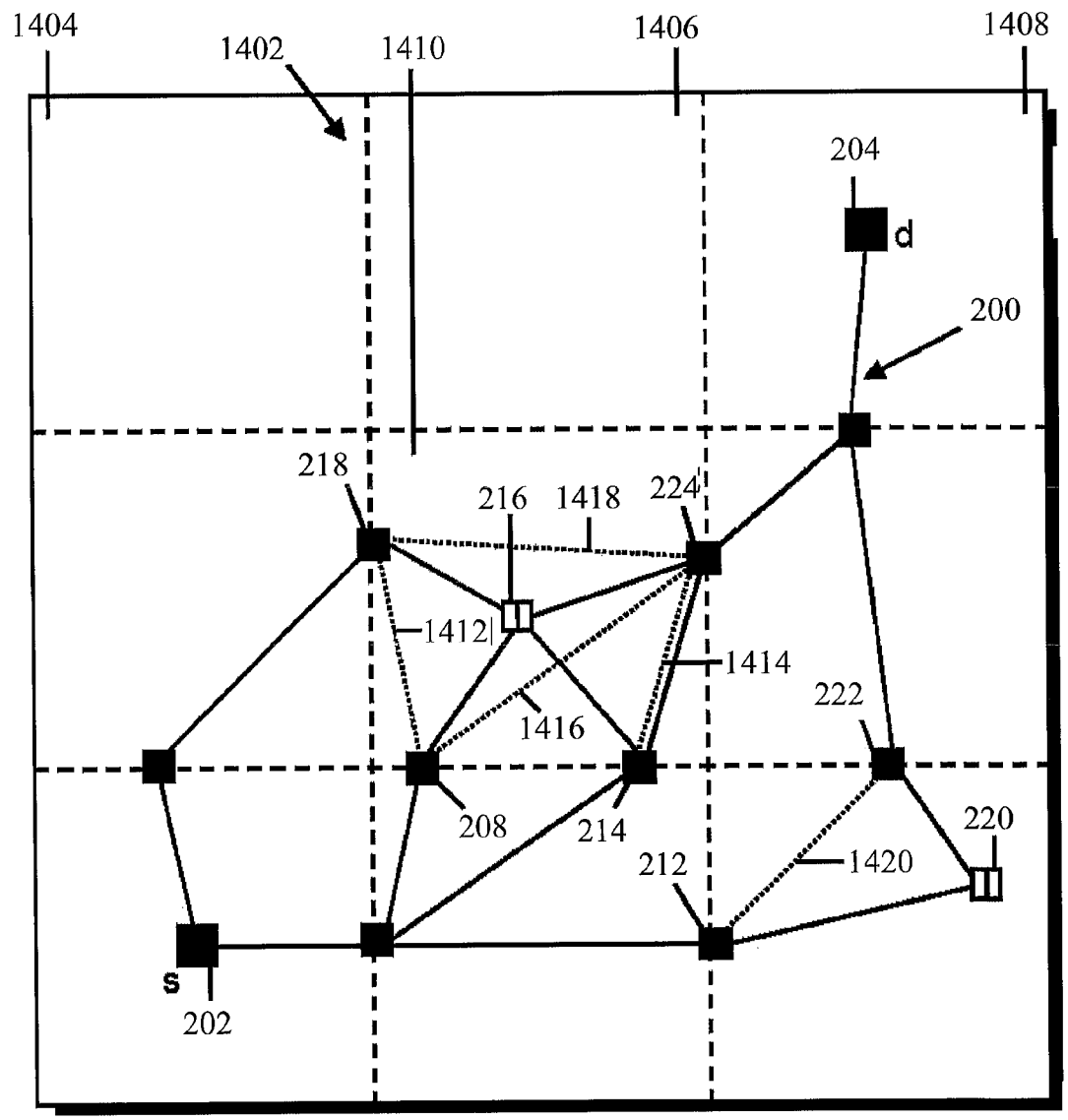
FIG. 14A schematically illustrates a route network corresponding to the method of FIG. 13.
Figure 14B:
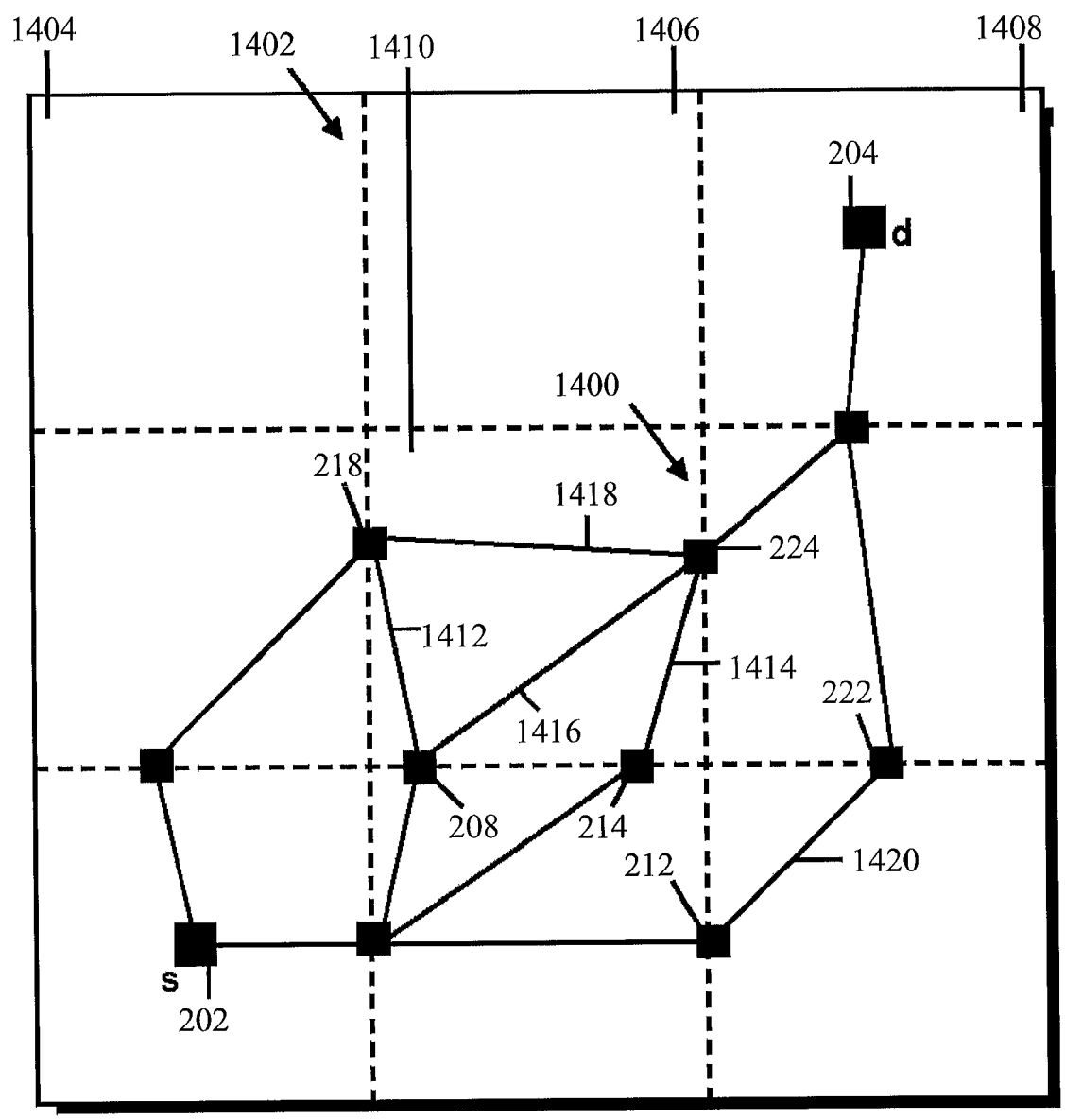
FIG. 14B schematically illustrates a third route network obtained in accordance with the method of FIG. 13.

FIG. 14A schematically illustrates a route network corresponding to the method of FIG. 13. FIG. 14B schematically illustrates a third route network 1400 obtained in accordance with the method of FIG. 13, as discussed above. The third graph represented by the third network 1400 may be defined based on a tiling 1402 and utilizing pre-defined information on tiles 1402-1410 of the tiling 1402, such as "resistance values" quantifying a resistance of the tiles, as described in European patent application No. 06 012 160.5, which is incorporated in its entirety in this application by reference.

As may be seen in FIGS. 14A and 14B, a tiling 1402 is defined that covers an area in which the road network 200 is contained and includes a plurality of tiles 1404-1410. For any tile of the tiling 1402, a pre-determined resistance value is provided that quantifies costs associated with routes traversing the tile, in relation to the graph geometry. For example, the resistance value for a tile 1404-1410 of the tiling 1402 may be defined to be equal to $$R = \min_{vi} \min_{vj}[\text{costs}(vi,vj)/\text{distance}(vi,vj)] \quad (10)$$

where vi and vj denote different vertices that are located on the boundary of the respective tile, costs(vi, vj) denotes the minimum costs associated with a route from vi to vj on the graph, and distance(vi, vj) denotes the air-line distance between vi and vj.

As seen in FIGS. 14A and 14B, based on the local resistance values for the tiles 1404-1410, a simplified third graph represented by the third route network 1400 (FIG. 14B) may be defined which, in all tiles other than the tiles containing the starting point 202 and the destination 204, only includes vertices located on tile boundaries. In other words, for any tile that does not include the starting point 202 or the destination 204, the vertices located inside the tile are omitted, as is the case for vertices 216 and 220 of the road network 200 of FIG. 14A. In the tiles in which vertices in the tile interior are omitted, such as in tile 1410 in FIGS. 14A and 14B, new graph edges 1412-1418 connecting the vertices 208, 214, 218, 224 located on the boundary of the tile are defined and are assigned costs based on the geometrical arrangement of the vertices and the resistance value of the corresponding tile. More particularly, the costs for a newly introduced edge of the third graph connecting the vertices vi and vj are set equal to $$\text{costs3}(vi,vj) = R \times \text{distance}(vi,vj). \quad (11)$$

Accordingly, the costs for edge 1418 may be set equal to the product of the resistance R of tile 1410 and the air-line distance of vertices 218 and 224. Due to the definition of the resistance values in Eq. (10), the costs for the new edges of the third graph represent a lower bound on the actual costs.

Based on the third graph represented by the third route network 1400 of FIG. 14B, constructed as outlined above, Dijkstra's algorithm or an A*-algorithm employing an air-line based estimation function may then be performed at step 1304 of the method of FIG. 13, starting at the starting point 202 and expanding towards the destination 204. Due to the construction of the third graph, the costs for routes from the starting point to any vertex of the third graph represented by the third route network 1400 represent a lower bound on costs associated with a route from the starting point 202 to the corresponding vertex on the first route network 200, and may therefore be utilized as an estimation function value when an A*-algorithm is performed on the first graph at step 1306.

For any vertex that is included in the first route network 200 but that is not included in the third route network 1400 (i.e., for vertices located in tile interiors), the estimation function value employed at step 1306 may be determined from the estimation function values for the vertices located at the boundary of the respective tile. For example, the estimation function value for vertex 216 may be set equal to the minimum of the costs determined for any one of vertices 214, 216, 218 or 224. After determining the estimation function values for the plurality of vertices of the first graph 200, the method may proceed with a route search from the starting point to the destination on the second graph, as described in connection with any one of the preceding implementations.

It will be appreciated that, in addition to the step of determining estimation function values being implemented as a two-stage process, the second route search of the method (i.e., the route search from the starting point to the destination), may also be implemented as a multi-stage process. Further, the methods according to the various implementations are not limited to two- or three-stage processes, but may include any suitable plurality of steps or stages, a subsequent step or stage utilizing results obtained in a preceding step or stage.

For each of the methods described above, the processor 102 may perform the route searches. As explained above, by re-using intermediate results from one route search for a subsequent route search, the average computational time required by the processor for each of the route searches may be decreased.

In summary, accurate estimation function values may be determined in a first stage that may be utilized to reduce the complexity of a route search performed in a second stage. The estimation function values determined in the first stage may be utilized for several route searches. The system may be employed in any optimum route search, in particular, in determining routes on a road network, without being limited to the later.

It will be understood, and is appreciated by persons skilled in the art, that one or more processes, sub-processes, or process steps described in connection with FIGS. 1-14 may be performed by hardware and/or software. If the process is performed by software, the software may reside in software memory (not shown) in a suitable electronic processing component or system such as, one or more of the functional components or modules schematically depicted in FIGS. 1 & 3. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention. For example, it should also be noted that, although the present invention is described with reference to graphs that can be embedded into a two-dimensional space, the present invention is not limited thereto. Rather, the principles of the present invention are equally applicable to higher dimensional objects, e.g., three-dimensional graphs.

The invention claimed is:

1. A method performed in a processor of determining a route using a navigation system having an input unit, position determination unit, storage unit, and the processor, the method comprising:

identifying a first starting point using the position determining unit, whereby the location of the first starting point may change in time to become a second starting point;

identifying a destination using the input unit;

retrieving a plurality of network elements from the storage unit that stores at least a first graph and a second graph;

determining estimation function values corresponding to a plurality of vertices on the first graph corresponding to a first route network, where an estimation function value for a vertex in the plurality of vertices represents a lower bound on costs associated with searching for a route from the vertex to the destination, where determining an estimation function value for the vertex comprises a route search on the first graph which starts at the destination and expands from the destination towards the first starting point;

storing the estimation function values in the storage unit; and searching, by the processor, for a first route from the first starting point to the destination on the second graph based on the estimation function values, the second graph associated with a plurality of elements, the searching for the first route by the processor comprising, determining whether an estimation function value for a given vertex in the plurality of vertices is stored in the storage unit, and determining the estimation function value for the given vertex in the plurality of vertices if no estimation function value for the given vertex is stored in the storage device;

wherein a first cost model is associated with the first graph and a second cost model is associated with the second graph, the second cost model being selectively determined to be either the same or different from the first cost model.

2. The method of claim 1, where the step of determining an estimation function value for the vertex comprises searching for a route on the first graph from the vertex to the destination on the first graph, wherein the search is performed as described by the equations below and the vertex is selected to minimize f(v) such that $$f(v)=g(v)+h(v) \qquad (1)$$

where f(v) represents the sum of costs accrued, $$g(v)=costs(s,v) \qquad (2)$$

where g(v) represents the costs accrued along a route from the first or subsequent starting point, s, to the vertex, v, and $$h(v)=costs(v,d) \qquad (3)$$

where h(v) represents the estimation function for the vertex, v, that is a cost for a route from the vertex, v, to the destination, d.

3. The method of claim 2, where the step of searching for the route from the vertex to the destination is performed using Dijkstra's algorithm on the first graph.

4. The method of claim 2, where the step of searching for the route from the vertex to the destination is performed using an A*-algorithm on the first graph.

5. The method of claim 1, further comprising searching for a second route from the first starting point to the destination on the second graph based on the estimation function values, the second route being different from the first route.

6. The method of claim 5, where the second route comprises at least one of an alternative route from the first starting point to the destination or a route from the second starting point to the destination.

7. The method of claim 5, further comprising monitoring a current position relative to the first route from the first starting point to the destination, where the step of searching for the second route is automatically initiated based on a result of the step of monitoring the current position.

8. The method of claim 5, further comprising monitoring changes of costs associated with at least one of the elements of the second graph, where the step of searching for the second route is automatically initiated based on a result of the step of monitoring changes of costs.

9. The method of claim 1, further comprising:
storing at least a subset of the estimation function values; and
retrieving at least one estimation function value from the subset.

10. The method of claim 1, where the step of determining the estimation function values is done using a first cost model, and the step of searching for the first route is done using the second cost model.

11. The method of claim 10, where costs associated with at least one element of the first graph according to the first cost model are time-independent.

12. The method of claim 10, where costs associated with at least one of the plurality of elements of the second graph according to the second cost model are variable.

13. The method of claim 12, further comprising:
adjusting the costs based on at least one of user preferences, a traffic information signal, a time of day, or a date.

14. The method of claim 13, where the step of adjusting comprises increasing the costs for at least one element relative to the first cost model.

15. The method of claim 12, where costs associated with an element of the first graph according to a first cost model represent a lower bound on costs associated with a corresponding element of the second graph according to the second cost model.

16. The method of claim 1, where the first graph is defined so that an average time to search for a route on the first graph is faster than an average time to search for a route on the second graph.

17. The method of claim 1, where the first graph has fewer vertices than the second graph.

18. The method of claim 1, where the first graph includes a plurality of edges, each edge in the plurality of edges representing at least one road segment of a road network; and where the second graph includes a plurality of vertices, each vertex in the plurality of vertices representing at least one road segment of the road network.

19. The method of claim 1, where one of the first graph and the second graph is a dual graph of the other.

20. The method of claim 1, where the first graph is identical to the second graph.

21. The method of claim 1, further comprising:
performing a route search on a third graph; and
utilizing a result of the route search on the third graph to determine the estimation function values for the plurality of vertices;
wherein a third cost model is associated with the third graph, the third cost model being selectively determined to be either the same or different from either the first cost model or the second cost model.

22. The method of claim 1, where the step of determining an estimation function value for the vertex comprises searching for a route from the vertex to the destination on the first graph based on pre-calculated information on the first graph.

23. A device for determining a route to a destination comprising:
a storage unit for storing data defining a plurality of elements for at least one of a first graph and a second graph;
a processor coupled to the storage unit to retrieve the graph data, where the processor is configured to determine estimation function values corresponding to a plurality of vertices on the first graph corresponding to a first route network, where an estimation function value for a vertex in the plurality of vertices represents a lower bound on costs associated with a route from the vertex to the destination, where the processor performs a route search on the first graph which starts at the destination and expands from the destination towards a first starting point to determine the estimation function value for the vertex, and to search for a route from the first starting point to the destination on a second graph based on the estimation function values, the second graph associated with a plurality of elements, the searching for the first route by the processor comprising determining whether an estimation function value for a given vertex in the plurality of vertices is stored in the storage unit, and determining the estimation function value for the given vertex in the plurality of vertices if no estimation function value for the given vertex is stored in the storage device; and
a position determining unit coupled to the processor to determine a current vehicle position, where the processor is configure to compare the current vehicle position to the route from the first starting point to the destination, and to search for a route from the current vehicle position to the destination on the second graph based on a result of the comparison,
wherein a first cost model is associated with the first graph and a second cost model is associated with the second graph, the second cost model being selectively determined to be either the same or different from the first cost model, and
wherein the storage unit is configured to store the estimation function values.

24. The device of claim 23, where the processor is configured to search for a route on the first graph to determine the estimation function values.

25. The device of claim 23, where the processor is configured to search for a route to the destination based on the determined estimation function values.

26. The device of claim 23, further comprising:
a second storage unit coupled to the processor for storing the determined estimation function values.

27. The device of claim 23, where the processor is configured to determine the estimation function values based on a first cost model, and to search for the route from the first starting point to the destination based on the second cost model.

28. The device of claim 27, where costs associated with at least one element of the first graph according to the first cost model are time-independent.

29. The device of claim 28 where costs associated with at least one of the plurality of element of the second graph according to the second cost model are variable.

30. The device of claim 27, where costs associated with an element of the first graph according to a first cost model represent a lower bound on costs associated with a corresponding element of the second graph according to the second cost model.

31. The device of claim 27, further comprising:
an input unit coupled to the processor to receive a user input, where the processor is configured to adjust costs associated with the second cost model based on the user input.

32. The device of claim 27, further comprising:
a clock unit coupled to the processor and configured to determine at least one of a time and date, where the processor is configured to adjust costs associated with the second cost model based on the at least one of the time and date.

33. The device of claim 27, further comprising:
a traffic message receiver coupled to the processor and configured to receive a traffic information signal, where the processor is configured to adjust costs associated with the second cost model based on the traffic information signal.

34. The device of claim 27, where the processor is configured to adjust costs associated with the second cost model by increasing the costs associated with the second cost model for at least one element relative to the first cost model.

35. The device of claim 23, where the first graph is defined so that an average time to search for a route on the first graph is faster than an average time to search for a route on the second graph.

36. A navigation system, comprising:
a device for determining a route to a destination, the device comprising:
a storage unit for storing data defining a plurality of elements for at least one of a first graph and a second graph;
a processor coupled to the storage unit to retrieve the graph data, where the processor is configured to determine estimation function values corresponding to a plurality of vertices on the first graph corresponding to a first route network, where an estimation function value for a vertex in the plurality of vertices represents a lower bound on costs associated with a route from the vertex to the destination, where the processor performs a route search on the first graph which starts at the destination and expands from the destination towards a first starting point to determine the estimation function value for the vertex, and to search for a route from the first starting point to the destination on a second graph based on the estimation function values, the second graph associated with a plurality of elements, the searching for the first route by the processor comprises determining whether an estimation function value for a given vertex in the plurality of vertices is stored in the storage unit, and determining the estimation function value for the given vertex in the plurality of vertices if no estimation function value for the given vertex is stored in the storage device;
a position determining unit coupled to the processor to determine a current vehicle position, where the processor is configure to compare the current vehicle position to the route from the first starting point to the destination, and to search for a route from the current vehicle position to the destination on the second graph based on a result of the comparison; and
an output unit to output information corresponding to the route,
wherein a first cost model is associated with the first graph and a second cost model is associated with the second graph, the second cost model being selectively determined to be either the same or different from the first cost model,
wherein the storage unit is configured to store the estimation function values.

37. A non-transitory tangible machine readable medium containing a sequence of instructions executable by a processor for executing a method of determining a route using a navigation system, the method comprising:
identifying a first starting point using a position determining unit, whereby the location of the first starting point may change in time to become a second starting point;
identifying a destination using an input unit;
retrieving a plurality of network elements from a storage unit that stores at least a first graph and a second graph;
determining estimation function values corresponding to a plurality of vertices on the first graph corresponding to a first route network, where an estimation function value for a vertex in the plurality of vertices represents a lower bound on costs associated with searching for a route from the vertex to the destination, where determining an estimation function value for the vertex comprises a route search on the first graph which starts at the destination and expands from the destination towards the first starting point;
storing the estimation function values; and
searching for a first route from the first starting point to the destination on a second graph based on the estimation function values, the second graph associated with a plurality of elements, the searching for the first route by the processor comprising,
determining whether an estimation function value for a given vertex in the plurality of vertices is stored in the storage unit, and
determining the estimation function value for the given vertex in the plurality of vertices if no estimation function value for the given vertex is stored in the storage device,
wherein a first cost model is associated with the first graph and a second cost model is associated with the second graph, the second cost model being selectively determined to be either the same or different from the first cost model.

38. The non-transitory tangible machine readable medium of claim 37, where the step of determining an estimation function value for the vertex comprises searching for a route on the first graph from the vertex to the destination on the first graph, wherein the searching is performed as described by the equations below and the vertex is selected to minimize f(v) such that $$f(v)=g(v)+h(v) \quad (1)$$

where f(v) represents the sum of costs accrued, $$g(v)=costs(s,v) \quad (2)$$

where g(v) represents the costs accrued along a route from the first or subsequent starting point, s, to the vertex, v, and $$h(v)=costs(v,d) \quad (3)$$

where h(v) represents the estimation function for the vertex, v, that is a cost for a route from the vertex, v, to the destination, d.

39. The non-transitory tangible machine readable medium of claim 38, where the step of searching for the route from the vertex to the destination is performed using Dijkstra's algorithm on the first graph.

40. The non-transitory tangible machine readable medium of claim 38, where the step of searching for the route from the vertex to the destination is performed using an A*-algorithm on the first graph.

41. The non-transitory tangible machine readable medium of claim 37, the method further comprising searching for a second route from the first starting point to the destination on the second graph based on the estimation function values, the second route being different from the first route.

42. The non-transitory tangible machine readable medium of claim 41, where the second route comprises at least one of an alternative route from the first starting point to the destination or a route from a second starting point to the destination.

43. The non-transitory tangible machine readable medium of claim 41, the method further comprising monitoring a current position relative to the first route from the first starting point to the destination, where the step of searching for the second route is automatically initiated based on a result of the step of monitoring the current position.

44. The non-transitory tangible machine readable medium of claim 41, the method further comprising monitoring changes of costs associated with at least one of the elements of the second graph, where the step of searching for the second route is automatically initiated based on a result of the step of monitoring changes of costs.

45. The non-transitory tangible machine readable medium of claim 37, the method further comprising:
storing at least a subset of the estimation function values; and
retrieving at least one estimation function value from the subset.

46. The non-transitory tangible machine readable medium of claim 37, where the step of determining the estimation function values is done using the first cost model, and the step of searching for the first route is done using the second cost model.

47. The non-transitory tangible machine readable medium of claim 46, where costs associated with at least one element of the first graph according to the first cost model are time independent.

48. The non-transitory tangible machine readable medium of claim 46, where costs associated with at least one of the plurality of elements of the second graph according to the second cost model are variable.

49. The non-transitory tangible machine readable medium of claim 48, the method further comprising:
adjusting the costs based on at least one of user preferences, a traffic information signal, a time of day, or a date.

50. The non-transitory tangible machine readable medium of claim 49, where the step of adjusting comprises increasing the costs for at least one element relative to the first cost model.

51. The non-transitory tangible machine readable medium of claim 48, where costs associated with an element of the first graph according to a first cost model represent a lower bound on costs associated with a corresponding element of the second graph according to the second cost model.

52. The non-transitory tangible machine readable medium of claim 37, where the first graph is defined so that an average time to search for a route on the first graph is faster than an average time to search for a route on the second graph.

53. The non-transitory tangible machine readable medium of claim 37, where the first graph has fewer vertices than the second graph.

54. The non-transitory tangible machine readable medium of claim 37, where the first graph includes a plurality of edges, each edge in the plurality of edges representing at least one road segment of a road network; and where the second graph includes a plurality of vertices, each vertex in the plurality of vertices representing at least one road segment of the road network.

55. The non-transitory tangible machine readable medium of claim 37, where one of the first graph and the second graph is a dual graph of the other.

56. The non-transitory tangible machine readable medium of claim 37, where the first graph is identical to the second graph.

57. The non-transitory tangible machine readable medium of claim 37, the method further comprising:
performing a route search on a third graph; and
utilizing a result of the route search on the third graph to determine the estimation function values for the plurality of vertices;
wherein a third cost model is associated with the third graph, the third cost model being selectively determined to be either the same or different from either the first cost model or the second cost model.

58. The non-transitory tangible machine readable medium of claim 37, where the step of determining an estimation function value for the vertex comprises searching for a route from the vertex to the destination on the first graph based on pre-calculated information on the first graph.

* * * * *